US007606868B1

(12) United States Patent
Le et al.

(10) Patent No.: US 7,606,868 B1
(45) Date of Patent: *Oct. 20, 2009

(54) UNIVERSAL FILE ACCESS ARCHITECTURE FOR A HETEROGENEOUS COMPUTING ENVIRONMENT

(75) Inventors: Bich Cau Le, San Jose, CA (US); Robert Frederick Deuel, Menlo Park, CA (US); Christian Czezatke, San Francisco, CA (US)

(73) Assignee: WMware, Inc., Palo Alto, CA (US)

( * ) Notice: Subject to any disclaimer, the term of this patent is extended or adjusted under 35 U.S.C. 154(b) by 672 days.

This patent is subject to a terminal disclaimer.

(21) Appl. No.: 11/395,082

(22) Filed: Mar. 30, 2006

(51) Int. Cl.
G06F 15/16 (2006.01)
(52) U.S. Cl. .......................... 709/211; 709/219; 707/10; 718/1
(58) Field of Classification Search ................. 709/211, 709/202, 203, 217–219, 226, 208; 707/200, 707/10; 718/1
See application file for complete search history.

(56) References Cited

U.S. PATENT DOCUMENTS 6,564,228 B1 * 5/2003 O'Connor ................... 707/200
6,829,617 B2 * 12/2004 Sawdon et al. .............. 707/102
2006/0123062 A1 * 6/2006 Bobbitt et al. .............. 707/200

* cited by examiner

Primary Examiner—David Lazaro
(74) Attorney, Agent, or Firm—Rajeev Madnawat

(57) ABSTRACT

An architecture and system are described that provide a unified file access service within in a managed computing environment composed of diverse networks, computing devices, and storage devices. The service provides mechanisms for remotely accessing the file systems of any managed computer or disk snapshot, independently of the computer's current state (powered on, suspended or powered off), its location within the environment, its hardware type (virtual vs. physical), its operating system type, and its file system formats. The system isolates centralized FPAs from the details of clients, proxies and storage elements by providing a service that decomposes offloaded file system access into two steps. A FPA or a requester acting on behalf of the FPA first expresses the disk set or the computer containing the file systems it wishes to access, along with requirements and preferences about the access method. The service figures out an efficient data path satisfying the FPA's needs, and then automatically configures a set of storage and computing resources to provide the data path. The service then replies with information about the resources and instructions for using them. The FPA then accesses the requested file systems using the returned information.

32 Claims, 18 Drawing Sheets

UNIVERSAL FILE ACCESS ARCHITECTURE FOR A HETEROGENEOUS COMPUTING ENVIRONMENT

BACKGROUND OF THE INVENTION

1. Field of the Invention

Embodiments of the present invention relate to file access within a managed computer environment having diverse networks, computing devices and storage devices.

2. Related Art

In a managed computing environment, there are a large number of issues and trade-offs to consider when setting up a file processing application (FPA) for offloaded client file access. The trade-offs between synchronized file system access versus snapshot access, along with the dependences introduced by proxy-based snapshot access methods, usually result in highly specialized configurations that unnecessarily tie file processing applications to storage infrastructure elements.

In order for a centralized file processing application to remotely access a file system of a disk set, a data path between the application and the disk set must be established, and a valid storage stack must be constructed along that path in order to expose the file system. The stack is usually constructed by logical volume managers (LVMs) and file system drivers that understand the formats used by the file system and the volume it is mapped onto.

There are many difficulties with the offloaded file access methods of the prior art, as illustrated in FIG. 1. For instance, when a file processing application 14 wishes to access the file system of a disk set belonging to a client computer, it must decide up-front whether or not it requires access to the most current version of the file system. A network file system connection like the one between the FPA's computer 12 and the client 20 is the most common way for the two computers to safely share a file system residing on disk set 26. The network file system driver 16 and the network file server 22 ensure that local access by programs on the client to the file system exposed by storage stack 24 is synchronized with remote access by programs running on computer 12.

However, synchronized network access to a client's file systems suffers from several limitations. The client computer must be active; a computer cannot export a network file system if it is powered off. If, for instance, FPA 14 wishes to access the most current version of disk set 36 of client 28 using a network file system, it cannot if the client is inactive. Also, a connection cannot be made if the computer hosting the FPA and the client computer have incompatible network file system components, in other words, a server component and a driver component that do not use the same file sharing protocol. Transferring data over a general purpose network can increase network congestion and impact the responsiveness of other computers using the network.

Frequent access to a client's network file system can also impact the client's performance, since the client's network file system has to consume disk and processor (CPU) resources to service file requests. The requester may not be able to access a file locked by a program running on the client, called the "busy files" problem. This is an issue if the requester is a backup application, in which case locked files will be skipped by the backup process.

Accessing a snapshot of the disk set, instead of the disk set itself, solves the busy file problem. For instance, to access disk set 34 of client 30, the FPA can request snapshot manager 54 (which could be a systems or storage management application) to create a snapshot 46 from disk set 34 and to mount the snapshot on proxy computer 40, so that the FPA can access the disk set through a network file system exported by the proxy's network file system server 42. Since the client is not accessing the snapshot, the FPA has exclusive access to the snapshot's file systems. Snapshot access can also improve performance by bypassing the general-purpose IP network. It is possible, for example, to install a FPA 58 directly on a proxy 56 to access snapshot 64; this would give FPA local disk access via the high-speed storage bus, eliminating the need to use the general-purpose IP network and the network file system server 60.

Unfortunately, using snapshots introduces new problems. First, for the above example to be valid, the proxy must be able to construct a storage stack 44 from the snapshot 46, in other words it must have LVMs, file system drivers, and programs capable of decoding the formats used by the client's volumes, file systems, and files. Because of the proprietary nature of some volume, file system, and file formats, commercial-quality LVMs, file system drivers, and programs tend to be available on (and bundled with) a limited set of operating system types. In practice, this means that the proxy computer used to mount the snapshot of a client computer generally has to run an operating system and software stack that is similar or identical to the one used by the client. This constraint creates rigid dependences between clients, the proxies compatible with those clients, snapshot managers, and file processing applications.

To illustrate those dependencies, assume that clients 30 and 48 use different operating systems, volume formats, and file system formats. Proxy 40 is compatible with the OS and formats of client 30 and can thus be used to process its disk set snapshots, however it is incapable of processing snapshots of client 48's disk set. Similarly, if proxy 56 is compatible with client 48, it is likely to be incompatible with client 30.

Providing access to a variety of snapshots, each using different volume and file system formats, therefore generally involves setting up multiple proxy computers, each with a different operating system and a different set of LVMs and file system drivers. Not only does this configuration increase hardware costs, it also increases setup and management complexity. The incompatibilities above also complicate the design and configuration of file processing applications. In order to access the snapshot of a particular client, a FPA needs to know beforehand what compatible proxy computers to mount a network file system from. The incompatibilities thus create a rigid dependence between FPAs and proxies. This dependence can become even more rigid when a FPA is configured exclusively for local file system access to improve performance. Recall that FPA 58 can be installed directly on a proxy 56 to bypass the network and gain local access to snapshot 64. Such a set up can reduce flexibility even more, since the FPA cannot locally access the file systems of clients dissimilar to client 48.

When an FPA relies on a particular proxy for accessing snapshots, the proxy becomes a potential performance bottleneck limiting scalability. During file access, the proxy has to provide CPU cycles for running the network file system server used by the FPA if it is remote, or for running the FPA itself it is locally installed. This limits the number of simultaneous snapshots and file systems that a FPA can process in parallel at a given time. The FPA can be configured to access one file system at a time to avoid concurrency issues, but this would increase the total amount of time needed to process a potentially large number of file systems belonging to multiple clients. The situation is aggravated when the proxy is used by multiple FPAs.

A final drawback of snapshot access is caused by the definition of snapshots themselves. If a FPA accesses a client's file systems through a snapshot of the client's disks, it will be incapable of making any modifications to the current version of client's file systems, since the snapshot represents a past version. Any changes that the FPA makes to the snapshot will not be visible nor available to the running client.

Virtual machines whose virtual disks are mapped to files instead of physical disks introduce additional issues for offloaded file processing applications. Synchronized network file system access to an active virtual client is not a problem, since the software stack of a running virtual machine operates identically to that of a physical machine, and can thus provide a storage stack and network file system server for the virtual disks' file systems. Accessing the file systems of a powered-off virtual machine or a virtual machine snapshot is more difficult, since an additional storage stack is needed to access the file systems that contain the virtual disks. For this reason, existing systems and storage management software generally offer no or limited file access support for inactive, file-based virtual machines.

This problem is compounded by the fact that computing environments that include virtual machines tend to have large numbers of powered-off virtual machines.

There are two reasons for this. Unlike real machines, file-based VMs are easy to duplicate because they are just files, and this can lead to large numbers of VMs. On the other hand, running a VM consumes a hosts' CPU and memory resources, potentially impacting other VMs running on the same host, so VMs that are not immediately needed in daily business operations tend to be left powered off.

In summary, it is difficult for offloaded file processing applications that provide protection and prevention, such as file backup and virus scanning applications, to access the files of powered-off VMs. Since they cannot be checked and protected around the clock, inactive VMs can pose a security threat or data protection problem to the IT administrator.

A given file processing application is often bound to a specific access method, e.g., synchronized network file system access versus snapshot access. Once the access method is selected, the File Processing Application (FPA) has to operate with the limitations of that method, such as the busy files problem and the inability to access powered-off clients in case of synchronized network access.

When an FPA is configured to access snapshots, it is usually bound to a specific proxy computer through a network file system connection or by running directly on the proxy. A proxy computer's limited ability to decode diverse volume and file system formats restricts the FPA's ability to process the files of client disk sets not compatible with the proxy.

Despite virtual machines becoming an increasingly important component of modern computing environments, existing systems and storage management infrastructures provide limited offloaded file access ability to virtual disks. In particular, it is difficult or impossible for centralized FPAs to access the file systems of suspended and powered-off VMs.

Therefore, the prior art lacks a general and scalable mechanism for a file processing application to access the file systems of diverse computers in diverse states. Offloaded file processing can simplify the management of file processing applications. In some cases, it can also improve overall client and network performance. The two most commonly used offloading methods are synchronized network file system access, and unsynchronized snapshot access using a proxy.

There are many trade-offs between the two methods. For this reason, offloaded FPAs tend to be configured for one access method or the other, but rarely both. This results in highly specialized and inflexible setups that can be time-consuming and costly to set up. In particular, when snapshots and proxies are used in a heterogonous environment, the diverse LVM and file system driver requirements imposed on proxy computers can increase hardware costs and complicate software configurations. For instance, to fully take advantage of the performance benefits of snapshots, centralized FPAs need to be configured to run directly on proxy computers. This means that FPAs and proxies generally have to be aware of each other and are configured together, thereby increasing setup complexity.

Finally, there currently exists no general framework allowing centralized FPAs to access the file systems of file-based virtual machines, especially powered-off virtual machines and virtual disk snapshots.

SUMMARY OF THE INVENTION

Accordingly, embodiments of the present invention provide a general and scalable mechanism for a file processing application to access the file systems of diverse computers in diverse states in the form of the Universal File Access (UFA) service. UFA advantageously decouples FPAs from the infrastructure, allowing them to access arbitrary disk sets without requiring the details of configuring storage and computing elements to enable the access.

More specifically, embodiments of the present invention isolate centralized FPAs from the details of clients, proxies and storage elements by providing a service that decomposes offloaded file system access into two steps. An FPA or a requester acting on behalf of the FPA first expresses the disk set or the computer containing the file systems, files, and optionally internal elements of files that it wishes to access, along with requirements and preferences about the access method. The service figures out the most optimal data path satisfying the FPA's needs, and then automatically configures a set of storage and computing resources to provide the data path. The service then replies with information about the resources and instructions for using them. The FPA or requester then accesses the requested file systems using the returned information.

The indirect access method allows FPAs to be configured separately and independently of clients, proxies, and storage elements. Not only does this simplify software setup and management, it also enables flexible and powerful ways of configuring FPAs to process the file systems of disk sets belonging to a large number of diverse client computers.

The framework that provides this service is called Universal File Access.

UFA allows a requester program running anywhere in the managed computing framework to access the file systems of a disk set belonging to any client computer or snapshot, independently of: the computer and software stack on which the requester is running; the location of the client or snapshot; the volume, file system, and data formats used on the disk set; the client's computer hardware type (physical or virtual), if the disk set belongs to a client computer; and the client's state, e.g., powered-on, powered-off or suspended.

A requester may use the UFA service by first establishing a control connection with a UFA service provider. It then sends one or more commands specifying the disk set, the file system(s) of interest on the disk set, optionally the files of interest within the selected file system(s), optionally the internal records of interest within the selected file(s), and the method by which it wishes to access the selected items. An example of an internal record of a file: a particular entry of a database, which itself is composed of one or more files. The control connection is typically made over a general purpose IP network.

In one embodiment, the UFA service provides up to three methods for accessing a file system of a disk set. The first method creates a temporary network file system that is mapped to the selected file system. The requester and other programs running on any networked computer can mount, then access the network file system using a file sharing protocol such as CIFS or NFS. The mounted network file system is a data connection allowing files to be inspected, copied, and manipulated. This method employs two connections: one for sending the request to the UFA service, and one for mounting and accessing the network file system.

A requester can be a file processing application itself, and access the file systems exposed by UFA. A requester can also use UFA to expose a file system to another file processing application. In the second case, the FPA does not need to know about UFA; it merely operates on a file system that the requester sets up on its behalf using UFA.

The second method allows a set of files or internal elements of files to be copied or manipulated directly over the control connection itself. The second method is simpler and can be more efficient when transferring a small number of files, since it uses only one connection.

The third method makes a temporary copy of a FPA program specified by the requester, loads the copy into the memory of an anonymous computer chosen by the service, and then executes it on the proxy. The computer may have the disk set's file systems locally mounted (using a local or distributed storage bus) for the duration of the execution, giving the FPA local access to them while it is running. This method may provide better file processing performance than the other two, since the FPA can potentially access the file system over a dedicated storage bus, such as a SAN, instead of a general purpose IP network.

DETAILED DESCRIPTION OF THE INVENTION

Reference will now be made in detail to the preferred embodiments of the present invention, a system and method optimizing data throughput to a processor from a storage device having sequential data access capabilities where the processor enables its data cache for memory accesses involving the storage device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

SECTION I

Overview

Figure 1:
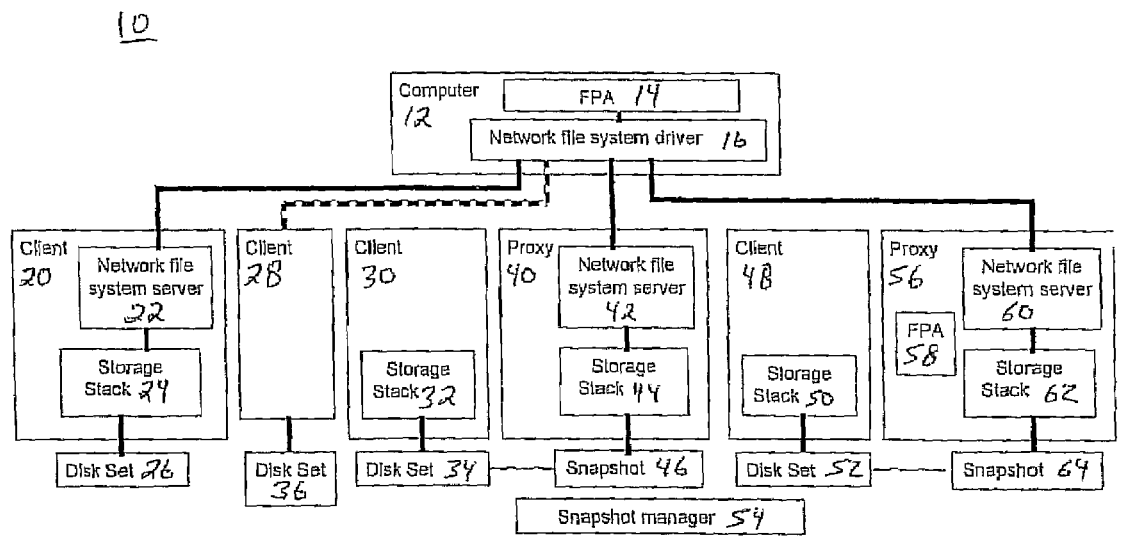
FIG. 1 is an exemplary system illustrating offload file access methods of the prior art.
Figure 2A:
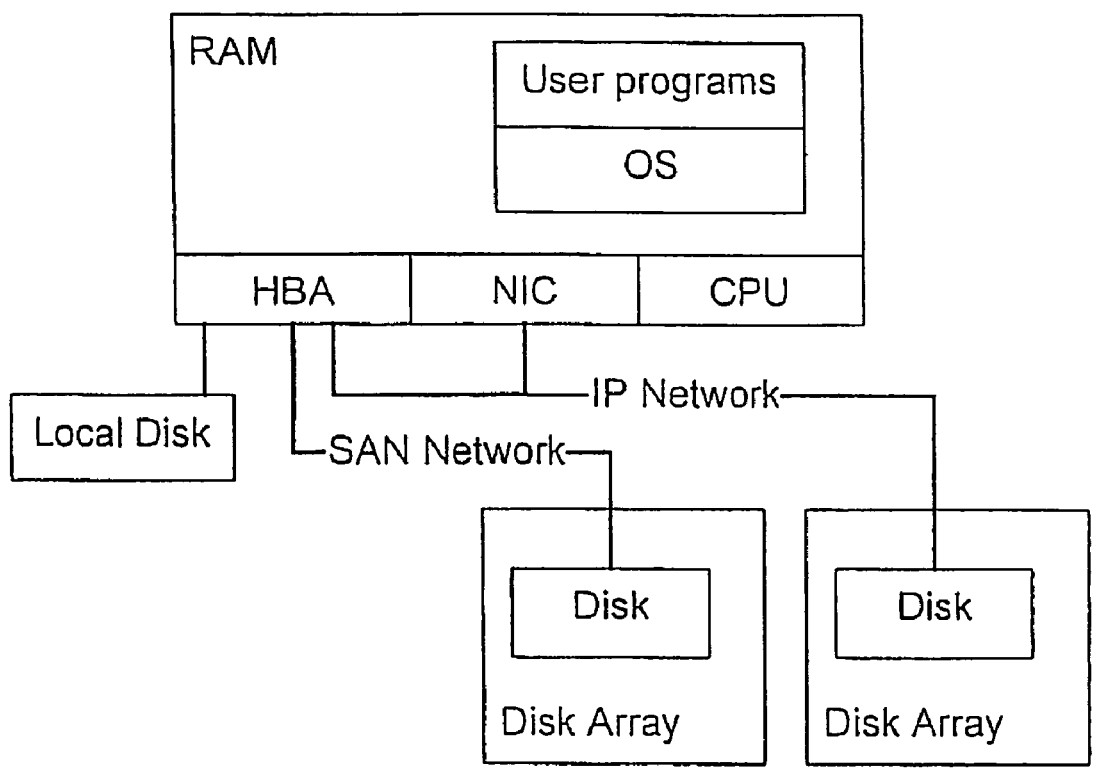
FIG. 2A illustrates exemplary components of a minimal server computer.

FIG. 2A shows the typical components of a minimal server computer 70. The computer has at least one central processing unit (CPU), random access memory (RAM), at least one host bus adapter (HBA), one or more disks, and at least one network interface card (NIC). The disk provides stable and nonvolatile data storage. The RAM provides temporary data storage and is empty when the computer is powered off. When a computer is powered on, it undergoes a boot sequence which loads software from the disk to memory, and causes the CPU to execute instructions of the software in memory.

The software loaded from disk into memory is typically layered in a stack structure, with an operating system (OS) at the bottom, and user programs at the top. The OS manages hardware devices and provides an abstraction to those devices to user programs. This abstraction is a set of software interfaces, sometimes called application programming interfaces (APIs). A computer's software stack generally communicates with the software stacks of other computers through a internetwork of local area networks (LAN). A common communications protocol for exchanging data over those networks is the Internet Protocol (IP).

Access to disks is generally provided by a HBA device. Disks are attached to the HBA via a local bus, such as IDE or SCSI, or a distributed bus, such as storage area network (SAN) or a standard internet protocol (IP) network. A distributed bus can connect multiple HBAs and storage devices, allowing multiple computers to access and share disks that are physically remote. SAN or IP-connected disks are typically grouped and managed by devices called disk arrays.

Software uses disks to store both permanent and temporary information.

Figure 2B:
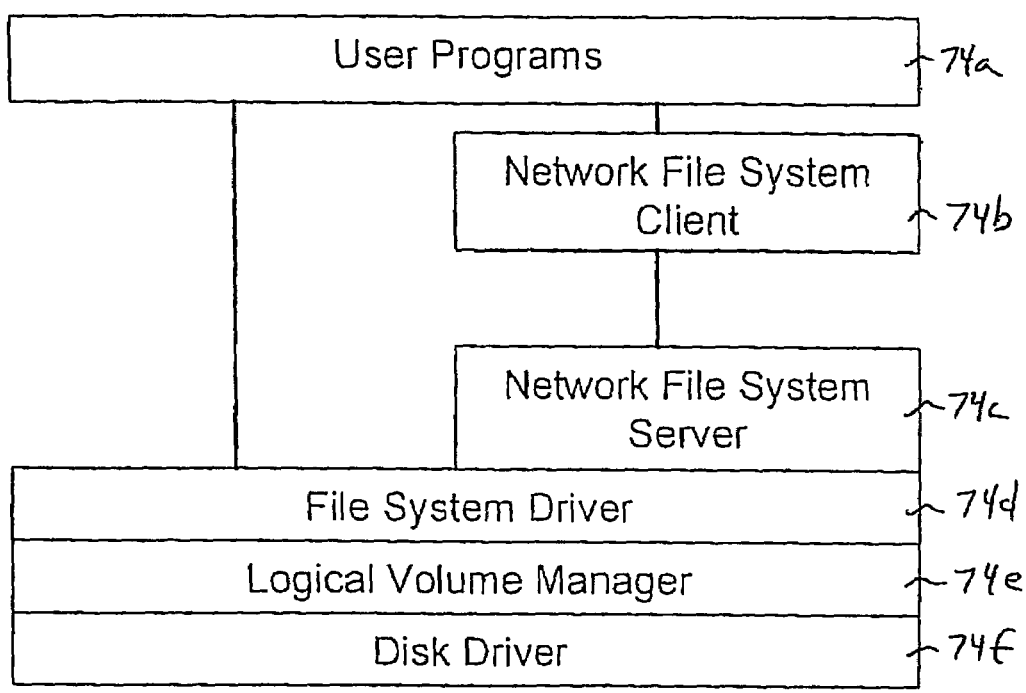
FIG. 2B is an exemplary internal storage stack for mapping sectors to files.

This information can contain data, program code, or both. Disks expose primitive data storage units called sectors, while operating systems and user programs tend to prefer working with the higher-level abstractions of files and directories. Modern software stacks typically include an internal storage stack for mapping sectors to files, as shown in FIG. 2B. A storage stack 74 generally resides in RAM is composed of multiple layers, each managed by a distinct software module such as a driver.

At the bottom, a disk driver 74f exposes a uniform model of physical disk devices to the layer above. While the data sectors of a physical disk may be stored on multiple platters and tracks, the disk driver 74f presents a disk to the layer above as a linear list of sectors, generally numbered 1 to N, where N is the total capacity of the disk in sectors. The disk driver 74f accesses a disk by communicating with a HBA device, and maps the disk's physical sector layout into the linear representation used by upper layers.

The next layer 74e, which is optional, is managed by logical volume manager (LVM). A LVM 74e can divide the linear disks exposed by the disk driver into smaller logical disks called volumes. This can be used, for instance, to break a large physical disk into smaller ones. A LVM can also make a volume span multiple physical disks. This can be used to create a large volume from several small physical disks. Advanced LVMs provide high end features such as mirroring, e.g. the ability to improve fault tolerance or performance by replicating a volume's data onto multiple disks or sections of a disk. The LVM stores the information needed to locate and manage volumes in hidden sectors called metadata sectors. Metadata is not directly exposed to the layer above. The set of rules governing how metadata is created and managed to represent volumes is called a LVM format. Most legacy personal computers employ a simple LVM format called partition table, wherein each volume is called a partition, and is described by an entry in a fixed-size table located near the beginning of the disk.

The layer above LVM is the file system layer 74d, and is implemented by a software component commonly called file system driver (FSD). An FSD organizes and structures the sectors of a volume into file and directory objects. The representation of those structures also requires storing information in metadata sectors that are hidden from the next layer above. The set of rules for creating and managing the metadata and data sectors of a file system is called a file system format. An FSD usually implements one specific file system format. An operating system can include multiple FSDs, each responsible for a particular file system format. For example, the Microsoft Windows 2000 OS includes a FAT driver responsible for the File Allocation Table format, and a NTFS driver for the New Technology File System format. The FSD exposes an upper interface for creating and accessing its file system's files and directories. This interface also includes a service to format an uninitialized volume, e.g. create an empty file system.

A file system generally occupies and uses the underlying volume in its entirety. Hence, there tends to be a one-to-one correspondence between volumes and file systems. As a result, formatted volume is a common synonym for a file system. The only case where a volume does not correspond to a file system is when it is unformatted (e.g. uninitialized). The disk, LVM and file system layers are usually part of the OS. Local user programs access the files and directories of a volume by sending requests to APIs exposed by the OS; the OS in turn forwards those requests to the FSD responsible for the volume.

A program running above the FSD layer can use a file to store a single data item in its entirety. It can also store multiple items or records within a file. For example: a database can be composed of one file, but internally holds thousands of records. The rules for organizing multiple records within a file constitute a data format. Just like file system formats, data formats can be open (i.e. publicly published and free), or proprietary. If a data format is proprietary, accessing the records of a file of that format generally requires interacting with a proprietary program that understands that format, through an API exposed by the program. A propietary program can be the operating system itself. For example, only the Windows family of operating systems is capable of reliably manipulating the internal contents of "registry hive" files. Consequently, other programs generally manipulate registry entries through a Windows operating system. In summary, successfully accessing a particular data item generally requires a specific software stack composed of the appropriate layers from the disk driver, LVM, file system driver, all the way to the operating system and possibly specialized user programs.

It is possible for a user program running on a remote computer to access the files of a local formatted volume, provided that the local OS includes a network file system server 74c component. This component uses the network to export the files and directories exposed by a local FSD to any other computer running a network file system driver that is compatible with the server, which means it uses the same file sharing network protocol. The protocol used is independent of the file system format of the local volume. Two common protocols for sharing files are Common Internet File System (CIFS) and Network File System (NFS).

While early generation computers traditionally use locally-attached disks as their storage medium, a recent trend has been to move storage away from computers to dedicated appliances connected via a distributed bus such as a SAN or IP network. There are two types of networked storage devices: those that expose disks, and those that expose file systems.

A disk array is an example of a disk-oriented storage device. It exports one or more disks to computers connected via a SAN or IP network. Fibre Channel is an example of a storage-over-SAN technology, while Internet SCSI (iSCSI) is an example of an storage-over-IP technology. When a computer uses a networked disk belonging to an array, the computer's software is responsible for providing a complete storage stack for creating and/or accessing file systems on the disk.

A storage appliance that exposes file systems instead of disks is usually called a network-attached-storage (NAS) device. In order to access a file system exposed by a NAS device, a computer's software needs to have the appropriate network file system driver for communicating with the device. In practice, this means having a client component that supports the network file system protocol (e.g. CIFS or NFS) used by the NAS device. In order to use a NAS file system, the client component mounts the network file system onto a local directory that the computer's software can then access. The mount process creates on the computer a shallow storage stack consisting of one file system layer, which is managed by the client component. A NAS device is typically implemented as a special purpose computer with locally attached disks, RAM, and a software stack with LVMs and file system drivers for partitioning the disks into volumes and file systems.

The links of a distributed bus may connected via switch devices. A switch can enable or disable connectivity between two devices attached to the network. This means that a disk array and a computer attached to the same network may not be able to communicate with each other if a switch on the network disallows it.

Networked storage devices and switch devices generally expose an interface allowing software to control and configure them. A device can be managed by sending control commands to its interface over the network. A SAN device that is connected to the SAN exclusively usually accepts commands sent over the SAN. It is also possible for a SAN device to be connected both to a SAN and an IP network. In this case, the device may accept commands through its IP connection.

File backup is the process of making copies of selected files at scheduled times for the purposes of archival and protection against unintentional data corruption or destruction. A common backup method, named network backup, involves running a backup agent program on every protected computer. At scheduled times, the backup agent copies a pre-selected set of files from the protected computer to another computer or file server on the network. The scheduling of backup jobs and the control of backup agents is often managed by a central program, commonly called backup server, running on a designated computer on the network.

Traditional file backup suffers from the busy file problem: it may not be safe, or even possible, for a backup agent to make a copy of a file if the file is currently in use by another program. The other program could be in the process of modifying the file, which could cause the backup copy of the file to contain inconsistent or partially consistent data. To make matters worse, some operating systems allow a program to open a file in exclusive mode, meaning only that program is allowed to read and write the file. A backup agent would be unable to read such locked files during a backup job, and would be forced to skip them, resulting in an incomplete backup job.

A common solution to the file sharing problem is to temporarily shut down programs during the backup period, forcing them to close their files to allow the backup agent to copy them. The time required to back up a set of files, and thus the length of the period during which the programs using those files must be suspended, is called backup window. The longer the window is, the more detrimental it is to business because it requires software applications, such as databases, to stop doing useful work. Computer administrators generally manage this problem by trying to (a) minimize the length of the window, and (b) scheduling backup jobs during off-peak business hours, thereby reducing the impact of suspending business applications.

Disk snapshotting is an emerging technology designed to reduce or eliminate the backup window problem. The idea is to solve the file sharing problem by presenting to the backup agent a separate replica of the volume containing the files it plans to copy. The replica, called snapshot, is a copy of the volume that is frozen in time at the point when the backup job is scheduled to begin. The period between the creation and destruction of a snapshot defines a snapshot session. During a snapshot session, software sees two volumes: the current volume, which most programs continue to access and use, and the snapshot, which the backup agent accesses. The snapshot contains a replica of the file system and files of the original volume. If it is configured to be the only program having access to the snapshot, the backup agent can safely read and copy the files it intends to backup. Once the desired files have been backed up, the snapshot can be destroyed, ending the session.

At the moment a snapshot session begins, a snapshot volume or disk is instantly created (from software's perspective), and its initial state (its contents) is equal to that of the primary disk or volume. A new storage stack can then be created for the snapshot, exposing a new file system instance to interested user programs, such as backup agents. Since the file system is based on the snapshot's disk data, it represents a point-in-time view of the primary file system.

There are several possible implementations of snapshots. The first is to make an exact and complete copy of the volume at the beginning of the session; the copy becomes the snapshot. This implies copying all the sectors of the volume to a new location, such as a separate disk. This approach has two drawbacks, the first of which is the high disk space requirement for storing the snapshot. The second is the potentially long time it may take to copy the volume. To prevent the volume being copied from being modified during the operation, all software activity has to be suspended, and it may be unreasonable to suspend it for the full amount of time required by the copy.

There is one situation in which using an exact and separate copy of the volume as a snapshot is attractive. As mentioned above, a logical volume manager may provide a mirroring capability. A mirrored volume has a physically separate replica that the LVM constantly updates and keeps synchronized with the primary copy. Mirroring can also be implemented in hardware at the disk layer by a HBA or disk array device.

Snapshotting can easily be implemented for a mirrored volume by temporarily suspending the synchronization of the replica, and then using the replica as the snapshot.

Figure 2C:
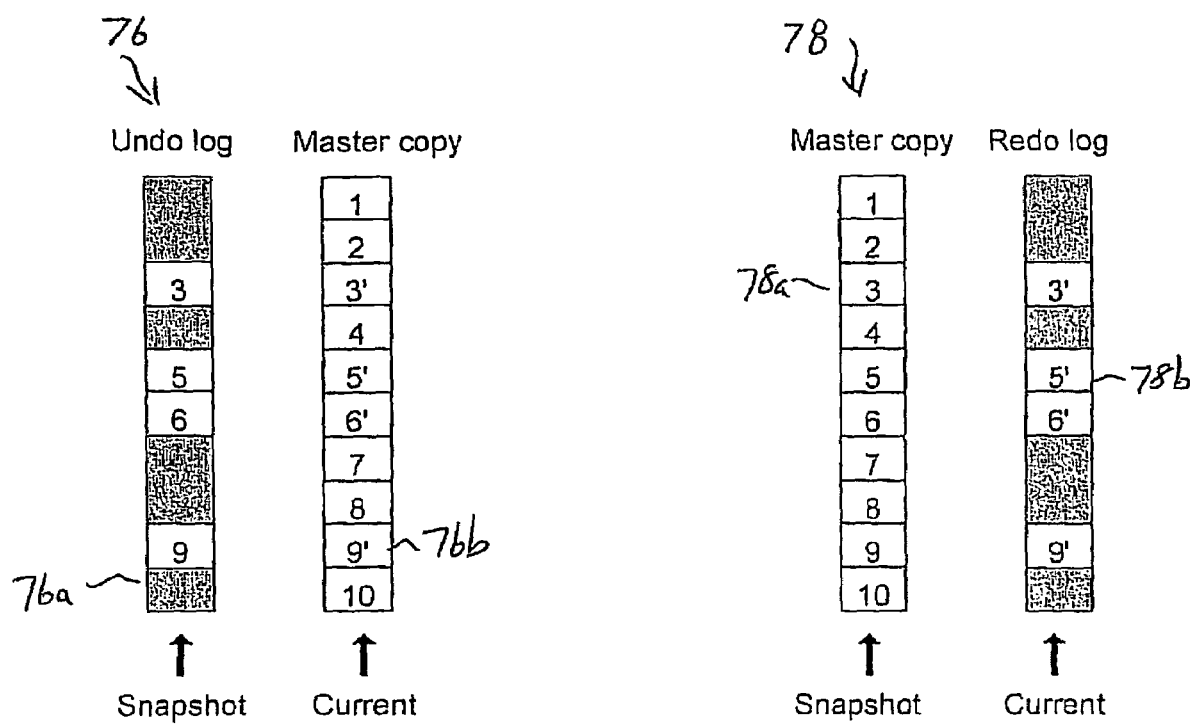
FIG. 2C illustrates two variations of the copy-on-first-write technique including undo log and redo log.

There are alternate snapshot implementations that do not require a full copy of the primary volume, and most use a copy-on-first-write algorithm. FIG. 2C illustrates two variations of the copy-on-first-write technique: undo log, and redo log.

In the undo log method 76, when a snapshot session begins, the snapshot provider creates a logical volume that captures the stable state of the primary volume at that point in time. This logical volume—the snapshot 76a—initially shares the same sectors as the master copy 76b of the volume. During the session, the snapshot provider tracks changes to the master 76b. When a particular sector of the master volume is about to be written for the first time, the content of the sector about to be overwritten is saved to a new sector allocated in a temporary storage area called undo log; the write is then allowed to proceed. The sector-by-sector contents of the snapshot can thus be defined as follows: use the content from the master if the sector has never been written, otherwise use the content from the undo log. The undo log is deleted at the end of the snapshot session.

The undo log approach 76 can be both space and time efficient. It is space efficient because only sectors modified during the snapshot session need to be copied; it is time efficient because the snapshot can be created immediately without requiring pausing active programs. The potential cost of the approach is slightly lower disk performance, since every write to the master copy results in two actual disk writes.

Undo-based snapshotting can be implemented either in software or hardware. Software implementations typically employ an intermediate driver that operates between the logical volume and file system layers. This driver assumes two responsibilities during a snapshot session: (a) maintain the undo log by intercepting writes to the master volume and saving the pre-modification content of the sectors about to be written into the undo log; (b) create and maintain the logical snapshot volume based on the real master volume and its associated undo log, and expose it to the above layers.

A hardware-based snapshot solution can be implemented in the HBA or disk array device. Undo log sectors are usually allocated out of a dedicated spare disk. Given that hardware lies at the bottom of the software stack illustrated in FIG. 2A, it generally implements snapshots at the disk, rather than the volume level, since hardware does not have knowledge of how volumes are laid out on disk. If, for example, a computer administrator intends to snapshot a particular volume for backup purposes, and the volume spans two physical disks, the administrator needs to configure the hardware to snapshot both disks.

The redo log approach 78 of FIG. 2C is similar to the undo log approach in its use of copy-on-first-write. The difference is that new sector values written during the session—instead of old ones—are stored in the temporary area, called redo log, while the master copy 78a represents the snapshotted volume. The state of the current version of the volume that most programs continue to access and modify is logically constructed as follows: for every sector position, if the sector was modified during the snapshot session, then the sector's current content is represented in the redo log 78b; otherwise, the content is represented by the master copy of that sector. When the session ends and the snapshot is no longer needed, modified sectors in the redo log are copied back to the base volume at their respective positions, and the redo log is discarded. Deleting a snapshot is thus referred to as a merge or commit operation from the redo log to the master copy.

One issue that the disk snapshotting raises and needs to resolve is the data consistency of the snapshot. The data consistency problem exists because modern file system drivers and the software layers above them can temporarily cache data that is intended to be written to disk. Cached disk data that is stored in memory and scheduled to be asynchronously written to disk at predetermined intervals (to improve I/O performance) is generally called dirty data. If a snapshot is taken at a moment when memory contains dirty data, then the volume or disk snapshot could represent an incomplete or inconsistent version of the snapshotted entity. Accessing an inconsistent disk, volume or file system can cause software to fail or result in data loss, or both.

From the perspective of volume snapshots, data inconsistency problems can generally occur at two levels: the file system, and user programs operating above the file system layer. A file system driver can cache both data and metadata dirty sectors in a memory area commonly called buffer cache. If on-disk state of a volume is suddenly frozen and the buffer cache discarded or ignored, which can result from a computer crash or a snapshot being taken, then the frozen volume could contain an inconsistent file system, e.g. one whose partially written metadata may not fully obey the file system format's rules and invariants.

When a potentially inconsistent file system is mounted, e.g. supplied to a file system driver in preparation for presentation to user programs, in the best case the file system driver will detect any errors in the metadata and correct them, resulting in a consistent file system, but at the potential expense of partial file data loss. In the worst case, the file system driver may determine that the file system is in an unrecoverable state and cannot be reused without a reformatting operation, resulting in total data loss.

Data inconsistency issues can also affect user programs. If a program temporarily caches or buffers data in its private memory before writing the data to a file, snapshotting the volume containing the file can lead to the snapshot copy of the file being inconsistent from that application's viewpoint.

To solve this problem, snapshot solutions sometimes include software modules that cooperate with file system drivers, and optionally user programs, to ensure that a snapshot is always consistent. This software cooperation process, which typically occurs just before a snapshot session, is called "quiescing." Before beginning a snapshot session, the snapshot solution's modules instruct the cooperating software to quiesce, e.g. temporarily suspend new data write requests, and flush previously written data from memory to the storage object provided by the software layer immediately below. For a user program, this means flushing dirty data from private memory to file object(s); for a file system driver, this means flushing the contents of its buffer cache to the appropriate volume or disk object.

When the snapshot solution receives the signal from cooperating software that quiescing is complete, it creates the snapshot by setting up and initiating the snapshot session (which could, for example, involve initializing a temporary storage area for an undo log or redo log), and then notifies the cooperating software to "un-quiesce," e.g., allow data writes to resume.

Given that a volume can span multiple physical disks, taking a snapshot of a running computer can involve taking a snapshot of the entire set of disks used by the client in order to ensure consistency of the volumes and file systems residing on the disks. It is appreciated that herein a disk set is classified as "active" if it is in use by a running computer, and "inactive" if no computer is currently accessing it. The disk set of a client computer is thus generally active if the client is powered on, and inactive if powered off. A snapshot of disk set is a disk set itself. When it is first created, the snapshot is initially inactive. It becomes busy when a powered on computer such as proxy begins to use its disks by mounting them.

A virtual machine may be discussed as an abstract computer whose devices are fully or partially implemented in software. The software, may be referred to as virtual machine monitor (VMM), creates a container for an environment that looks and behaves like a real computer. A complete software stack, called guest, possibly composed of an operating system and multiple user programs, can run in this environment.

A VMM creates and manages virtual devices and exposes them to the guest software. Such devices may include one or more virtual central processing units, virtual RAM, zero or more virtual HBAs, and zero or more virtual network interface cards. The VMM is responsible for receiving requests that the guest issues to virtual devices, and for servicing each request, which typically involves translating and then forwarding the request to a real device or object. The virtual RAM of an active (powered-on) virtual machine is typically allocated out of the real RAM of the host machine.

A host machine is a real computer used to host one or more virtual machines, each with its own run-time instance of the VMM. A host computer can optionally have a host OS. If a host OS is available, a VMM may communicate with real hardware (to, for example, service a guest request) through the host OS's interfaces and services. A VMM may also service some or all guest requests by communicating with hardware directly, bypassing the host OS if one exists.

Figure 3:
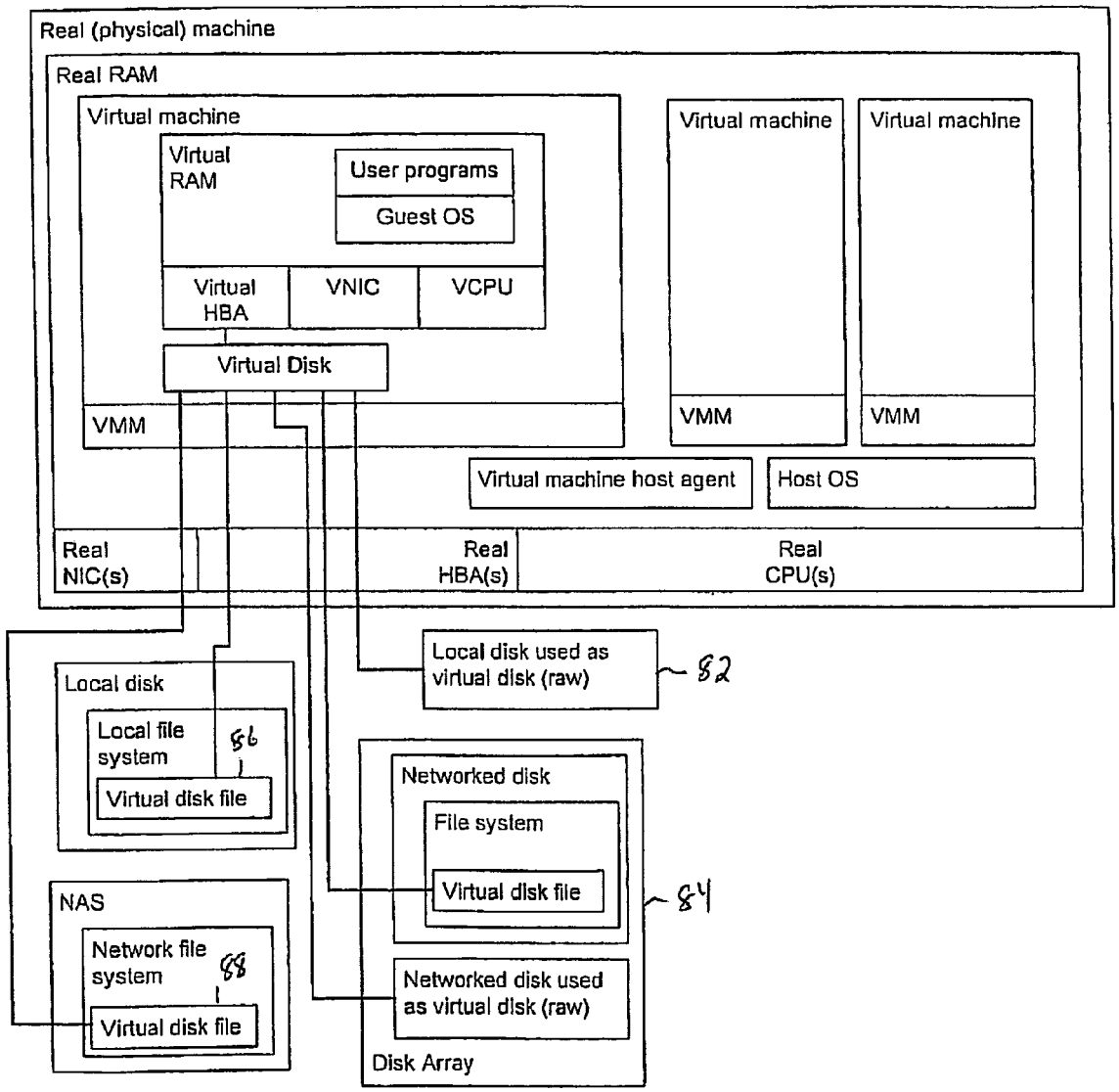
FIG. 3 illustrates two examples of a real disk used as a virtual disk, including a local disk and a networked disk belonging to a disk array.

FIG. 3 is an architecture 80 that illustrates common components of virtual machines and the host that they run on. If a virtual machine is configured with one or more virtual HBAs, the underlying VMM may expose one or more virtual disks to the guest. Since the guest uses the virtual disk for nonvolatile storage, the VMM generally maps the abstracted disk to a real storage object.

The first possibility is to map a virtual disk directly to a real disk, a configuration sometimes called raw disk mapping. In this case, the entire contents of the real disk are accessible to the guest. FIG. 3 shows two examples of a real disk used as a virtual disk: a local disk 82, and a networked disk belonging to a disk array 84. The second possibility is to map a virtual disk to a file residing on a real file system. FIG. 3 shows a virtual disk file 86 residing on a local file system, which itself resides on a volume carved out of a real local disk, and one virtual disk file 88 residing on a remote file system exported by a NAS device.

Figure 4A:
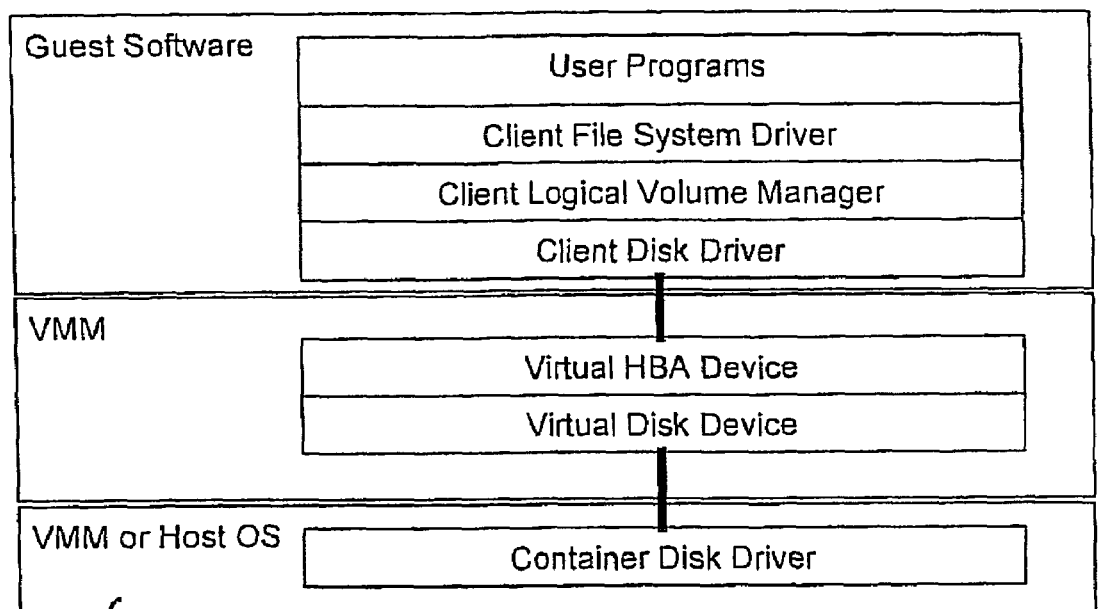
FIG. 4A shows the case of a virtual disk directly mapped to a raw disk which can be local or networked.
Figure 4B:
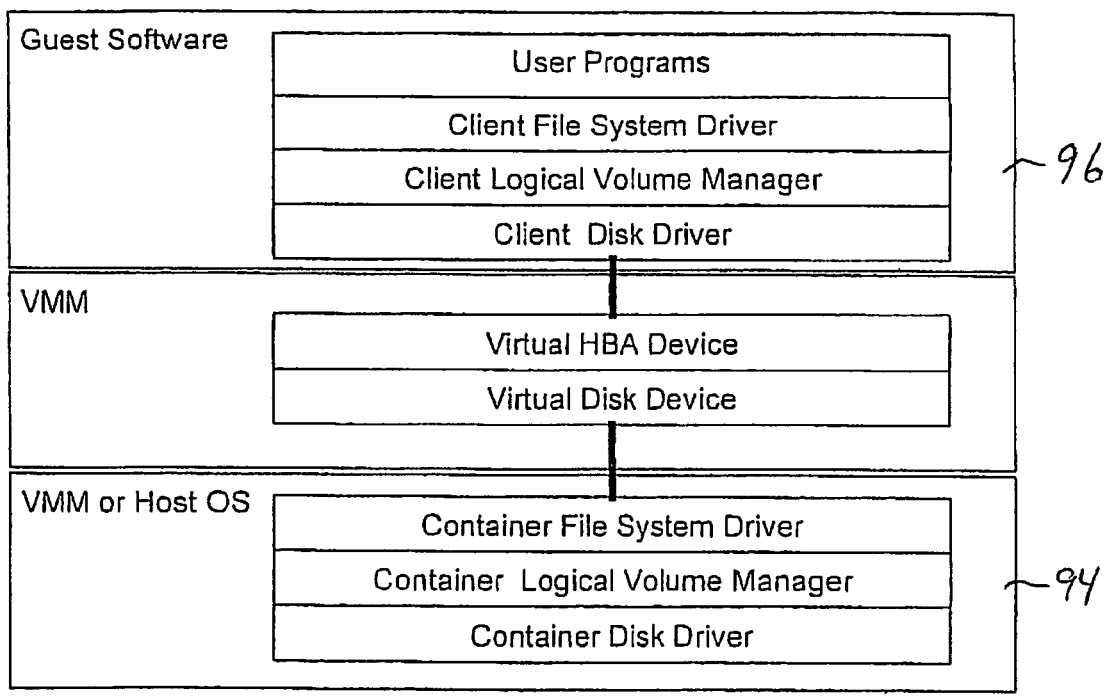
FIG. 4B illustrates how the container storage stack is related to the client storage stack.

FIG. 4A shows the case of a virtual disk directly mapped to a raw disk which can be local or networked. Here the container stack 92 only has the disk layer; the LVM and file system driver are not needed since the virtual disk is not a file. FIG. 4B illustrates an exemplary stack configuration. When a virtual disk is mapped to a file residing on a local or networked disk, either the host OS or the VMM, or both, are responsible for providing and processing the three bottom-most layers 94, e.g., disk driver, LVM, and file system driver, of the storage stack needed to access the file system containing the virtual disk file. Herein, the bottom layers are called the container storage stack and the upper layers 96 are called the client storage stack. FIG. 4B shows how the two storage stacks are related. It is appreciated that the volume and file system formats used by the two stacks could be completely different.

Figure 4C:
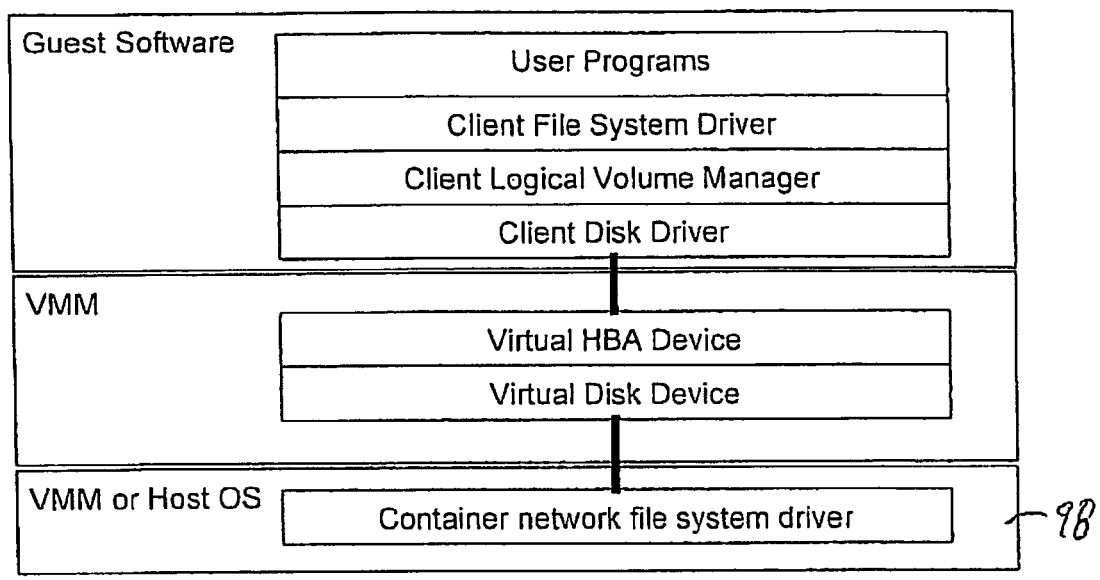
FIG. 4C shows the case of a virtual disk mapped to a file residing on a network file system served by a NAS or any computer with network file server software.

Finally, FIG. 4C shows the case of a virtual disk mapped to a file residing on a network file system served by a NAS or any computer with network file server software. In this case the host's storage stack has only one layer 98, and that layer is managed by a network file system driver. On the NAS or server computer, the served network file system may correspond to a disk-based file system that is local from the NAS or server computer's perspective. In this case, there exists another storage stack for the local file system. FIG. 4C does not show this stack.

For the most part, a virtual computer and the guest software stack running inside of it behave like and share the same characteristics as their real counterparts. For example, the guest may contain and use a storage stack to break a virtual disk into one or more volumes, each containing a file system. Most contemporary VMM implementations provide snapshotting capabilities for virtual disks that are mapped to files. Virtual disk snapshots commonly use the redo-log approach to create multiple versions of a virtual disk, each representing the disk's state at a certain points in time. When a VM using a virtual disk file is snapshotted, a redo log file is created, and all subsequent writes to the virtual disk are directed to the redo log. The original disk file, which is no longer updated, represents the point-in-time snapshot of the virtual disk.

Virtual machines are often used to test experimental and potentially harmful software, and reverting a virtual disk to a previous state to discard disk changes is a common operation. The redo-log approach is attractive because it makes the revert (also known as rollback) operation easy, e.g., merely delete the latest redo log. Many VMM implementations optionally allow the memory state (virtual RAM and volatile state of virtual devices) of a running virtual machine to be snapshotted alongside its disk state. This allows a user to revert a running VM back to a previous point in its execution history.

Every virtual machine has nonvolatile configuration state that may include the virtual machine's virtual hardware setup, and the type and location of its virtual disk(s), if any. VM configuration state may be stored in one or more files, or entries of a database, which themselves can reside on a local volume belonging to the host. In addition to the VMM, virtual machine software generally includes one virtual machine host agent (VMHA) program per host machine. The primary responsibility of a VMHA is to manage virtual machines residing on the host and to maintain their configuration state. A VMHA can, for example, create and destroy virtual machines. Additionally, a VMHA commonly provides a set of interfaces allowing humans and remote software to monitor, manage and control the host's virtual machines.

A virtual machine can be powered-on, powered-off, or suspended. The resources consumed by a powered-off virtual machine include the storage space used by its configuration state and its virtual disks, if any. When it is powered-on, a virtual machine additionally consumes a portion of the host's RAM, most of it used for the VM's virtual RAM, and host CPU cycles necessary for running the VM's guest software. A suspended virtual machine is one whose execution has been frozen in time, with the ability to be resumed at a later time. The suspended state is similar to the powered-off state, except for the addition of extra disk storage required to store the virtual machine's frozen virtual RAM and other volatile device state. A powered-off or suspended virtual machine is said to be inactive. A powered-on virtual machine is referred to as active.

Virtual machine software may allow a virtual machine to migrate from host to another. At the very least, the migration operation requires the virtual machine's virtual disk state, if it exists, to be transferred between the hosts. If the virtual disk is mapped to a local file or local raw disk on the first host, its contents must be copied to the second host. The virtual disk does not need to be copied if it is mapped to an object that is accessible by both hosts, like a networked raw disk, a file residing on a networked disk, or a file residing on a NAS. Additionally, if the virtual machine is active at the time of the migration, the process must also copy the virtual machine's virtual RAM state to the second host.

As companies and organizations place increasing demands on their computing resources, the size and complexity of their computing environments also grows, resulting in increasing management and maintenance costs. One major contributor to management complexity is the heterogeneous nature of large computing infrastructures. A large computer network typically includes many generations of computer hardware, multiple operating system types and versions, multiple software applications, and a diverse mix of both storage technologies, such as multiple file system formats, and multiple storage hardware (locally attached disks, SAN, and NAS). Each technology used can be supplied by a different vendor, and the tools and interfaces that the vendor provides to manage that technology may differ from those of other vendors, adding to a computer administrator's headaches.

While the introduction of virtual machine technology has eased certain problems, the need to manage VMs and the real machines hosting them, in addition to existing physical computers, has aggravated the overall complexity of the system.

Figure 5:
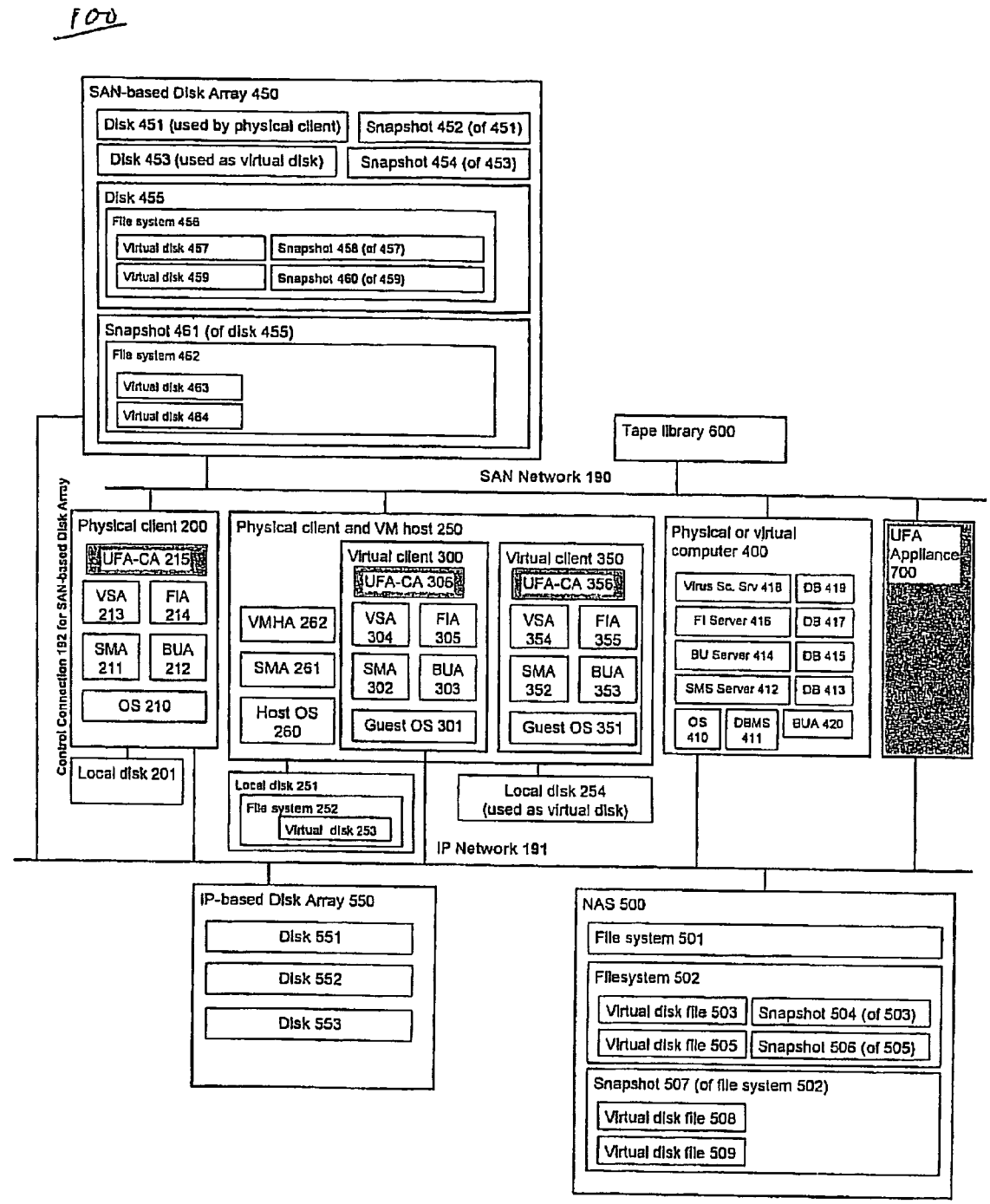
FIG. 5 shows an example of a complex and heterogeneous computing environment composed of physical machines, virtual machines, multiple types of networks (a storage area network and a general-purpose IP network), and multiple types of storage devices, including local disks, a SAN-based disk array, an IP-based disk array, and a NAS.

FIG. 5 shows an example of a complex and heterogeneous computing environment 100 composed of physical machines, virtual machines, multiple types of networks (a storage area network 190 and a general-purpose IP network 191), and multiple types of storage devices, including local disks, a SAN-based disk array (450), an IP-based disk array (550), and a NAS (500). The disks of physical computers can either be local (201) or reside on a disk array (451). Similarly, the virtual disks of virtual machines can be mapped to multiple types of data objects, including local disks (254), networked disks (453), files on a local disk (253), files on networked disk (457, 459), or files on a NAS (503, 505).

In addition to being connected to the SAN network, the disk array 450 may have a connection to the IP network 191 for receiving control/setup commands. Disk array 550 receives both control and data requests over the IP network. All three network storage devices are capable of taking snapshots of the primary storage entities that they expose. For instance, disk array 450 can take a snapshot of a disk 451 and expose it as disk 452. Similarly, the NAS 500 can take a snapshot of file system 502 and expose it as file system 507.

A systems/storage management (SM) application is a collection of software components designed to ease the management of a complex computing infrastructure that uses multiple technologies from different vendors. A typical SM application comprises a SM server program running on a dedicated computer, and one systems/storage management agent (SMA) program running on each managed computer. A computer managed by a SM server is generally called a client computer.

Two common services provided by SM are monitoring and control. The monitoring feature allows a computer administrator to view and record the health, performance, status and activity of clients. The control feature allows the administrator to manually or automatically perform operations on a client (or group of clients), potentially change its (or their) state. Examples of control commands include shutting down or restarting the operating system, remotely installing/updating software, and copying files from or to a client. Any computer, physical (real) or virtual, can become a managed client once an SMA is installed into its software stack. Given that virtual machines can be connected to the same IP network shared with physical machines, they appear and behave like any computer.

A SM application can thus manage virtual machines without knowing that they are virtual, as long as the VMs are equipped with the SMA and properly networked. To illustrate this, virtual machines 300 and 350 in FIG. 5 have SMAs 302 and 352 in their software stack, and therefore they can be treated as clients managed by the SM server 412 running on computer 400, which can be either physical or virtual.

Physical computers 200 and 250 of FIG. 5 are also SM clients. Physical computer 250 can act both as a SM client and a host for virtual machines 300 and 350. This means it is equipped with VMHA (262) and VMM (not shown) software in addition to the SMA 261. Although a SM application need not be aware of virtual machines to manage them, being VM-aware can allow it to offer additional functionality based on the unique capabilities and properties of VMs. If, for example, the SM server 412 knows that physical client 250 is a VM host, the server can communicate with VMHA 262 to perform VM-specific operations such as create, configure, destroy, or snapshot a VM residing on that host.

Some SM applications can also manage storage networks and devices such as SAN switches or routers (not shown), disk arrays 450 and 550, and the NAS 500. It is appreciated that the examples used herein assume the presence of a single SM application that is capable of managing all three types of devices: physical computers, virtual machines, and storage devices. In actuality, the three capabilities can be provided by separate, single-purpose SM applications, which are commonly referred to as a systems management application, a storage management application, and a virtual machine management application (or virtual machine controller), respectively. A SM server generally stores information about clients, networks and devices in a nonvolatile database.

FIG. 5 shows SM server 412 communicating with the database management system software 411 to manage the SM database 413. Although this example shows the DBMS and database residing on the same computer hosting the SM server, in reality the database components can reside anywhere in the computing environment, as long as the SM server can communicate with them over a network. Although SM agents are described as discrete software components, on some platforms they may be actually integrated with the operating system of clients. For example, the Windows Management and Instrumentation (WMI) component of modern Microsoft Windows operating systems shares similar characteristics and capabilities with the general concept of a SM agent.

File processing applications (FPAs) constitute an important class of computer software. A file processing application, activity, may be broadly defined as any application or process that accesses and processes files belonging to a potentially large number of computers. An offloaded file process or file processing application is therefore such an application performed in an offloaded fashion, as is typically the case, e.g., one computer operable on information managed by another computer. Well-known examples of file processing applications include backup software, virus scanners, file indexers, and patch conformance analyzers (also called software vulnerability detectors). Many of those applications are critical in a managed computing environment because they can protect data and report clients whose software is out-of-date or vulnerable to bugs and viruses. While some SM applications integrate and include some file scanning functionality, such as testing for the presence of specific software patches on client computers, most file processing applications are sold by alternate vendors that specialize in specific areas. For example, there is a large software industry built around file backup. Similarly, other vendors specialize in virus scanning software.

A file processing application designed for large computer networks tends to have a structure similar to that of a SM application. The structure comprises an agent program residing on each client computer, and a central server program that is responsible for controlling agents, aggregating their results, and providing humans with an administration interface. The server component may use a database for storing nonvolatile information.

FIG. 5 includes three examples of file processing applications: a backup application with server 414, database 415, and agents 202, 303, and 353; a file indexer with server 416, database 417, and agents 214, 305, and 355; and a virus scanner application with server 418, database 419, and agents 213, 304 and 354. Some applications process file data on client machines, and then send a summary status or report to the associated server. For example, after scanning a client's file system for files infected with viruses, a virus scanning agent can send a message containing a list of infected files to the virus scanner server, allowing the server to assess the severity of situation and optionally alert a human administrator. Some applications send the file data itself over the network to the server for processing. For example, a backup agent typically scans a client's file system to determine which files need to be backed up, and then transfers those files' contents to the backup server for archival. As an example, the backup server 414 in FIG. 5 may archive the received files to a long-term storage device, such as the tape library 600.

The presence of file processing applications can add complexity to the computer management problem, since agents need to be deployed, installed, maintained, and updated on each client. Since every file processing application can be sold by a different vendor, an administrator may have to learn to implement multiple, incompatible installation procedures for each application. A systems/storage management application, if it is used, can ease this problem somewhat by providing a facility to automatically install and update software, but the SM administrator would still need to configure this feature for each of the file processing applications.

FPA agents can impact the performance of client computers and impair their ability to serve primary functions, such as running business software. When a file processing application runs, its file access activity consumes both CPU and disk I/O resources, potentially slowing down other software programs running on the client. When an agent sends large amounts of data to its server, as in the file backup case, it can flood the network, potentially impacting other computers that share the same network. The third problem relates to the issue of file sharing errors, and was previously discussed in the File Backup section. What this means is a file processing application may need to skip certain files if they are locked by conflicting programs running on the client.

Many of the problems of the agent-based approach can be resolved by a running FPAs on a central computer instead of individual client computers. The central FPAs access and process client files remotely. This strategy, commonly referred to as offloading or consolidation, eliminates the need for client-specific FPA agents. Offloading simplifies software management because the FPA can be centrally managed on maintained on one computer or on a smaller number of computers. This is in contrast to having to install and manage one FPA agent on every client computer. Offloading can also improve the performance of client computers during file processing, since there are no FPA agents consuming CPU cycles on each client.

A central FPA generally uses one of two methods to access the file systems of client computers: (1) network file system access; and (2) snapshot access through a proxy computer.

A central FPA can mount a network file system of a client computer, then process the file system's files over the network using the selected file sharing protocol, and then unmount the file system when it is finished. The client provides the base storage stack, including disk, LVM and file system drivers. It must also include at least one network file system server to export the file system(s) exposed by its file system driver(s). The computer hosting the FPA must include at least one network file system driver that uses a network file sharing protocol compatible with the client's network file system server. One advantage of using a network file system is that it gives the FPA synchronized access to the latest, e.g. active version of the client's file systems. This means that any modification that the FPA makes to a shared file system will be visible and available to the client, and vice-versa. This is an important property for FPAs that create or modify files.

Directly mounting a network file system exported by the client assumes that the client is active, e.g. powered-on. If for any reason the client is powered-off, then there exist no storage stack and no network file system server for exposing the file systems of the client's disk set. It is therefore difficult for a central FPA to access the file systems of inactive clients.

Compared to the agent-based approach, a central FPA accessing client file systems over the network can actually degrade network performance even more. This is because the majority of file data and control operations initiated by the central FPA are exchanged over the network. In contrast, an equivalent FPA agent running on a client access files locally, and only uses the network when it exchanges data with the central server. Although a central FPA does not run directly on a client, it can still impact the client's CPU performance because the network file system server running on the client consumes CPU cycles when serving files over the network to the FPA.

A central FPA remotely accessing the network file system of a client and a local program on the client accessing the same file system both use the same file system driver in the client's storage stack. The file system driver arbitrates the sharing of files. This means that the FPA can encounter the busy file problem, that is, it may be denied access to a particular file if it is locked by a local program. In other words, the busy files problem occurs regardless of whether the file access is local or remote, because in both cases the client's storage stack arbitrates and synchronizes access to the same files.

The disk snapshots discussion above introduced snapshots and how they help backup applications work around the busy files problem. This advantage can be generalized to all offloaded FPAs. When a central FPA accesses a snapshot of the disk set of a client computer, the busy files problem does not apply because the FPA is accessing a logically separate disk set, and the access uses a separate storage stack, which differs from the stack that the client uses to access the most current version of its disk set.

Suppose that physical client 200 of FIG. 5 uses disk 451 residing on disk array 450 as its primary disk. The backup agent 212 is normally used to back up the files residing on the file systems on disk 451 to the backup server 414, and ultimately the tape library 600. As discussed, the agent may degrade the performance of both the client 200, and the IP network 191. If the disk array 450 is snapshot-capable, then a snapshot manager program, which is possibly integrated with the systems/storage management server 412, can instruct the array to create a snapshot 452 of disk 451 just before the backup process begins. Once the snapshot 452 is created, it can be exposed as another disk to any computer attached to the SAN network 190, such as computer 400.

Computer 400 can be configured as a proxy for the backup task by installing a backup agent 420 on it. First, disk 452 must be mounted on computer 400, meaning made visible to the computer so that a storage stack can be constructed for the disk, thereby exposing the disk's volumes and file systems to user programs in general, and the agent 420 in particular. Either the backup server 414 or the SM server 412 can trigger the snapshot and perform the mount operation by sending commands to disk array 450 through its control interface. The backup agent can then indirectly backup the files of disk 451 by backing up the files of its snapshot 452. The performance issues no longer apply, since the agent 420 does not consume any CPU and IO resources of client 200, and no data is transferred over the IP network. Data is still transferred over the SAN network, however this is generally what the administrator wants, since SAN networks comprise high-speed links specifically designed to carry storage traffic, in contrast to IP networks which are general-purpose.

Although the example shows that computer 400 acts both as a host for the file processing application server and a proxy, in reality any computer connected to the disk array can be a proxy.

One remaining issue is quiescing. In order for the volumes and file systems of snapshot 452 to be data-consistent, programs running on client 200 are preferably quiesced before disk array 450 is allowed to take the snapshot. Either the SM or backup server can coordinate the process by ordering SM agent 211 or backup agent 212 to instruct programs running on 200 to quiesce. If the SM agent 211 is capable to quiesce programs, then the backup agent 212 is redundant, and does not need to be installed on client 200. To generalize, using a proxy to perform file processing can simplify software maintenance by eliminating the need to install some types of agents on clients.

Snapshot access through proxies addresses the performance issues of network file system access. Once a snapshot has been taken from a client, the client no longer participates in the data flow between a central FPA and the snapshot, therefore it spends no additional CPU cycles. If the central FPA is installed directly on the proxy which mounts the snapshot, then it can access the snapshot's file systems locally, without using a general purpose IP network. Snapshots and proxies, however, introduce new issues, as discussed below.

When a disk snapshot is mounted onto a proxy computer, the computer's software must include a LVM and file system driver compatible with the disk's volume and file system formats. In theory, volume managers and file system drivers are self-contained software modules independent of the OS they run within. In practice, this is not the case, and there is a strong dependency between the components of a storage stack and the operating system that hosts them. The first reason is that LVMs and file system drivers usually run within an operating system, and must therefore use the OS's strict interfaces to register themselves and make their services available to user programs. A file system driver designed for the Windows operating system cannot, for example, generally run unmodified on a Linux operating system, even if the two operating systems are built to run on the same hardware platform.

A file system driver or LVM can be ported to another operating system, meaning its source code can be modified to satisfy the second OS's interfaces and constraints. Unfortunately, the source code of most commercial file system drivers and LVMs is owned by few companies. Those companies do not generally make source code public, and rarely port their code to competing operating system platforms.

Finally, a driver for a particular file system or logical volume format can be developed from scratch for a particular operating system if the format, e.g. the blueprint for how metadata and data sectors are laid out on disk, is public. Unfortunately, many file system formats are proprietary and not published, making it difficult to access certain file systems from certain operating systems. For instance, NTFS file systems are only available to programs running on certain Microsoft operating systems, since those operating systems are the only ones to include an NTFS file system driver. While implementations of the NTFS driver are available on other operating systems, such as Linux, those implementations were developed with an incomplete knowledge of the format derived from investigation and observation. Such drivers are thus inherently less reliable.

A similar issue arises when an FPA needs to access internal records of a file in a proprietary format. For example, an FPA may want to access a particular e-mail message stored in a mail server database. In another example, an FPA needs to access a particular entry of a configuration file, such as a Windows registry hive. Unless the format is open and freely usable, which would allow the FPA to access the item directly, the FPA needs to access the data through the software interface of a specialized proprietary program that knows how to access the data. The program itself may have strict requirements about the type of hardware and operating system it can run on. As described earlier, the specialized program can be the operating system itself. For instance, the most reliable way to access the entries of a Windows registry file is through a Windows OS.

A consequence of this is a that a proxy computer must generally have the same software stack and operating system as the computer whose disk was snapshotted. In the example of FIG. 5, this means computer 400 must have an identical or similar software stack as client 200, in order to access the volumes, files and file systems residing on disks 451 and 452, which could have been created by client 200 itself.

However, a heterogeneous computing environment may include many clients running different types and versions of operating systems, LVMs, file systems, and file types. Taking advantage of disk snapshots may require the administrator to set up multiple proxy computers, each running a different software stack and responsible for a specific set of volume and file system formats. This increases total hardware purchase and maintenance costs, especially considering that the SAN HBAs required in each proxy connected to the SAN can be expensive.

Since a particular software stack tends to dictate the choice of operating system for a particular proxy computer, the selection also imposes requirements on the FPAs running on the proxy. Software programs, like drivers, are generally tied to a particular operating system and must be developed and tested for that operating system. For example, suppose a computer administrator must provide snapshot-based file backup functionality for clients using NTFS and ext3 file systems. Since NTFS is generally available only on Windows operating systems, and ext3 available only on Linux, the administrator first needs to set up at least two proxies, one running Windows and one running Linux. Secondly, he or she has to find both a Linux and a Windows version of the backup agent. Finally, the backup server, regardless on what OS and computer it runs on, must be advanced enough to coordinate the data flow coming from the two different agents, adding complexity to its design.

If a virtual machine's virtual disk is mapped to a physical disk residing in a disk array, the disk array can snapshot the virtual disk like any other disk and present it to a proxy computer. As long as the proxy uses a software stack identical or similar to the virtual machine's, it will be able to mount and access the virtual machine's file systems. If, however, the virtual disk is mapped to a file residing on the physical disk, the proxy may be able to access the file system containing the virtual disk file, but it wouldn't be able to access the file systems contained within the virtual disk itself. This is because the proxy's storage stack would only handle the bottom half of the storage stack shown in FIG. 4A. Therefore, the file processing applications on the proxy would be denied access to the virtual machine's files.

While proxy-based file scanning eliminates the performance problems of client-based file scanning, the method may itself become a performance bottleneck, if too many agents are running simultaneously or processing too many files from multiple mounted disks. This can be caused by the proxy computer running out of CPU and RAM resources. Large computing environments comprising thousands of computers could therefore overwhelm a small number of proxies. Proxy computers could be configured with more hardware resources, adding to their cost. An administrator could also use multiple proxies to divide up the load, however this would increase software management complexity.

By definition, when an FPA access a snapshot of a client's disk set, it is accessing a past version of the disk set. Any changes that it makes to the snapshot will not be visible nor available to the client. For this reason, the use of snapshots tends to be restricted to FPAs that predominantly read files, as opposed to write or modify files; examples include backup programs and file indexers.

SECTION II

UFA Architecture of the Present Invention

Figure 6A:
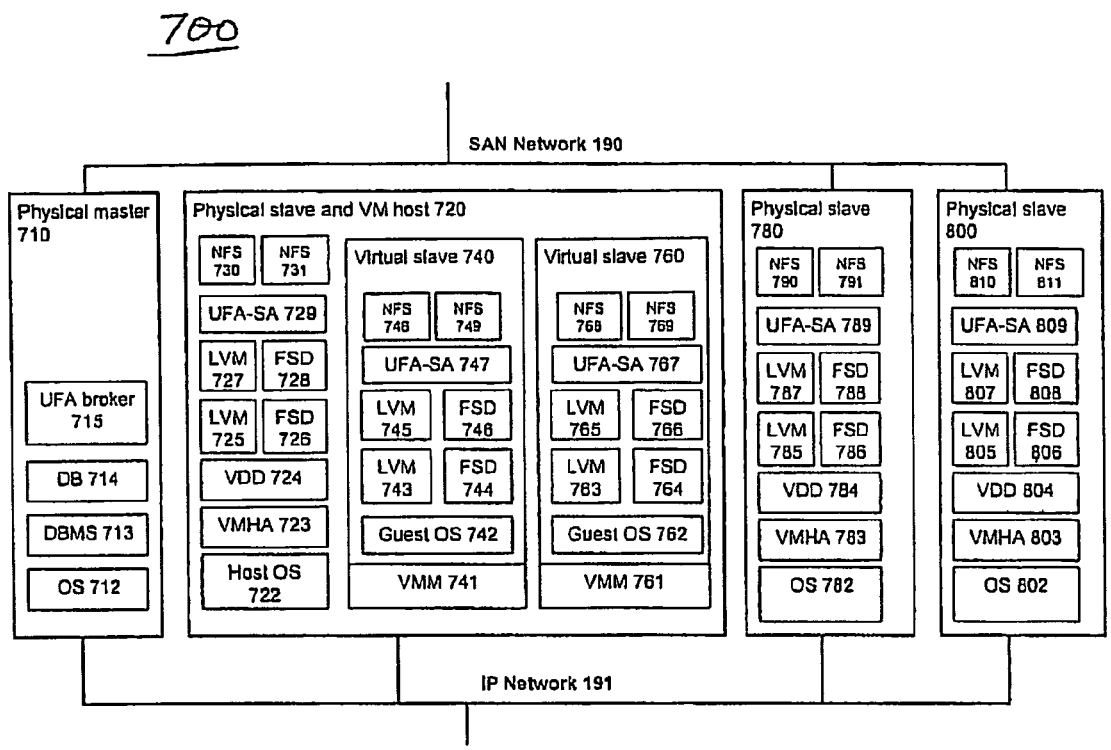
FIG. 6A illustrates an exemplary configuration for the unified file architecture (UFA) in accordance with an embodiment of the present invention.
Figure 6B:
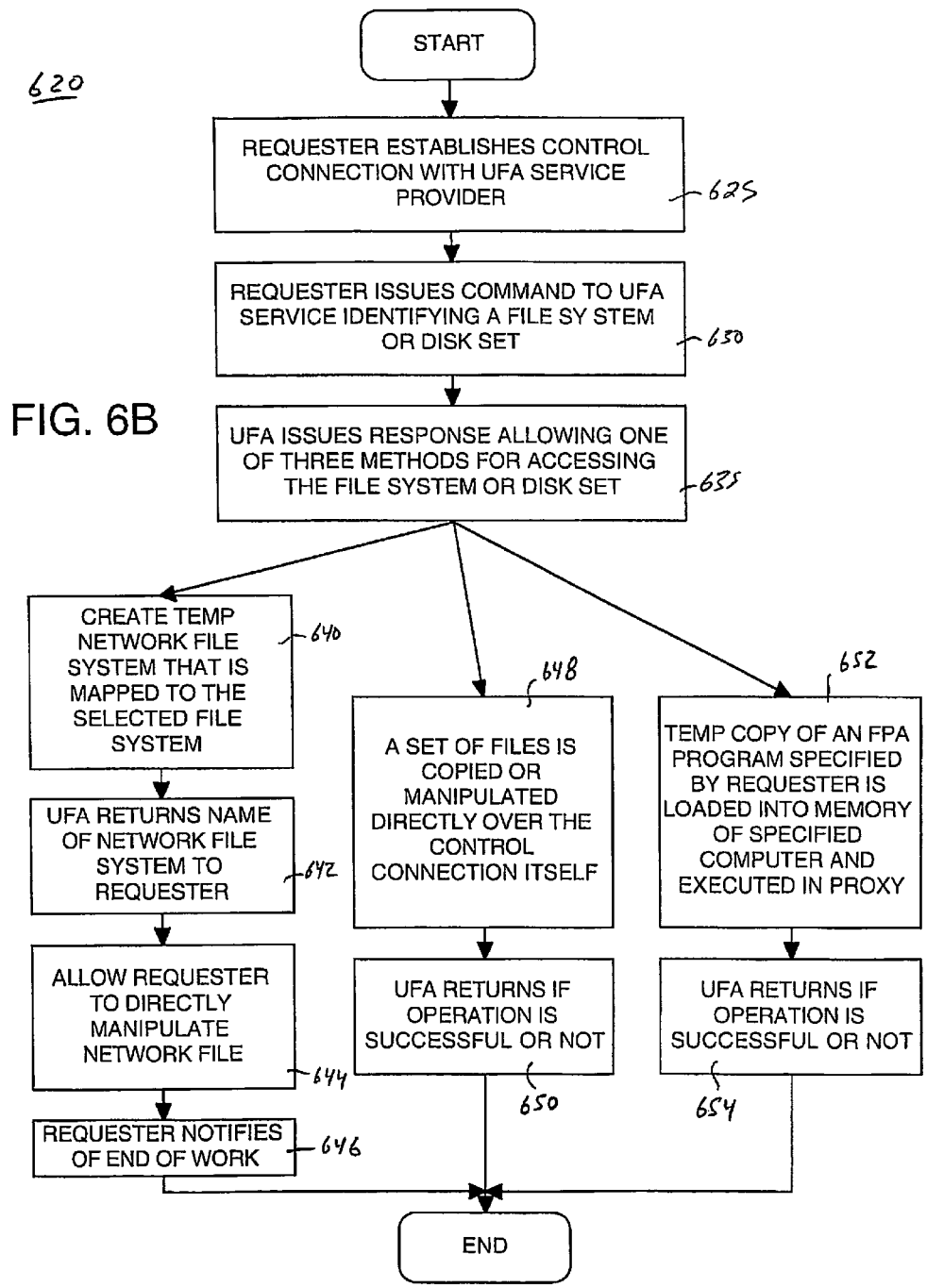
FIG. 6B is a flow diagram of the offloaded file operations using the UFA in accordance with an embodiment of the present invention.

FIG. 6A illustrates an exemplary Universal File Access Architecture (UFA) in accordance with an embodiment of the present invention. FIG. 6B illustrates a flow diagram of the offloaded file processing using the UFA in accordance with an embodiment of the present invention. Embodiments of the present invention isolate centralized FPAs from the details of clients, proxies and storage elements by providing a service that decomposes offloaded file system access into two steps. An FPA or a requester acting on behalf of the FPA first expresses the disk set or the computer containing the file systems it wishes to access, along with requirements and preferences about the access method. In addition to the disk set, computer, and file system, the expressed message optionally specifies specific files, and optionally internal records within the files. The service figures out an efficient data path satisfying the FPA's needs, and then automatically configures a set of storage and computing resources to provide the data path. The service then replies with information about the resources and instructions for using them. The FPA then accesses the requested file systems using the returned information.

The indirect access method allows FPAs to be configured separately and independently of clients, proxies, and storage elements. Not only does this simplify software setup and management, it also enables flexible and powerful ways of configuring FPAs to process the file systems of disk sets belonging to a large number of diverse client computers. The framework that provides this service is called Universal File Access (UFA). UFA of the present invention allows a requester program running anywhere in the managed computing framework to access the data of any client computer or snapshot, independently of: the computer and software stack on which the requester is running; the location of the client or snapshot; the volume and file system formats used on the disk set; the client's computer hardware type, e.g., physical or virtual, if the disk set belongs to a client computer; and the client's state, e.g., powered-on, powered-off or suspended.

As shown in FIG. 6B, a requester may use the UFA service in one embodiment by first establishing a control connection with a UFA service provider 625. It then sends one or more commands within a service request specifying the disk set, the file system of interest on the disk set, optionally the files of interest, optionally the records of interest within the files of interest, and the method by which it wishes to access the selected file systems 630. The control connection is typically made over a general purpose IP network. In one embodiment, the UFA service provides up to three methods for accessing a file system of a disk set, the selected method depends on the requester command 635.

The first method creates a temporary network file system that is mapped to the selected file system 640. The name of that network file system is returned to the requester 642. The requester and other programs running on any networked computer can mount, then access the network file system using a file sharing protocol such as CIFS or NFS 644. The mounted network file system is a data connection allowing files to be inspected, copied, and manipulated 644. In a first case, a requester can be a file processing application itself, and access the file systems exposed by UFA. A requester can also use UFA to expose a file system to another file processing application. When the requester is finished, a notification is sent to the UFA 646. In the second case, the FPA does not need to know about UFA; it merely operates on a file system that the requester sets up on its behalf using UFA 648. After setting up the network file system and launching the FPA, the requester waits for the FPA to finish executing. It then unmounts the network file system and sends a notification the UFA 646.

The second method allows a set of files and/or records within files to be copied or manipulated directly over the control connection itself. Though not as general as the first method, the second method is simpler and can be more efficient when transferring a small number of data, since it uses only one connection. The UFA will return a notification indicating if the requested job completed successfully 650.

The third method makes a temporary copy of an FPA program specified by the requester, loads the copy into the memory of an anonymous computer chosen by the service, and then executes it on the proxy 652. The computer may have the disk set's file systems locally mounted (using a local or distributed storage bus) for the duration of the execution, giving the FPA local access to them while it is running. This method could provide better file processing performance than the other two, since the FPA can potentially access the file system over a dedicated storage bus, such as a SAN, instead of a general purpose IP network. The UFA will return a notification indicating if the requested job completed successfully 654.

The UFA service or interface can be formalized and expressed as a set of commands grouped into a remotely invocable software interface. In one embodiment, this interface can be exposed using software methods and network protocols well known to those skilled in the art. The following command set is one example of how to present the service; some UFA embodiments may expose the service using a different command set, but with similar functions and capabilities. Each command may have input parameters, output parameters, or both. The requester of a command supplies input parameters, and the UFA service provider carrying out the command may return results in output parameters.

As discussed, a file system is a formatted volume, and a volume can span multiple disks. The union of all the disks that constitute the file systems of a client computer is a disk set. A snapshot of disk set is composed of individual disk snapshots, and can thus be treated as a disk set as well. A UFA requester expresses the file systems it wishes to access using a combination of one disk set identifier and one or more volume identifiers. The disk set identifier identifies the disk set containing the volumes of interest to the requester, and can be expressed in several forms.

In one embodiment, a disk set identifier can be expressed as a client computer identifier, in which case it refers to the group of disks used by the computer. A client computer can be identified by its network address, or by a unique number assigned by a systems/storage management application. Given that a client computer can be a virtual machine, a disk set identifier can also take the form of a virtual machine identifier assigned by virtual machine software. A disk set identifier can identify a particular snapshot of a group of disks. In this case, the device or software program that created the snapshot dictates how the identifier is expressed. For example, a virtual machine software product capable of creating snapshots of virtual machines may identify snapshots using textual strings or numbers.

In one embodiment, a disk set identifier can be a list of global disk identifiers, which identify the individual disks of the set. A global disk identifier uniquely identifies a physical disk or virtual disk file in the managed computing environment. The prior art provides several methods for globally identifying disk objects, such as globally unique numbers or bus/device-relative identifiers. For example, a disk of a disk array can be globally identified using a combination of the disk array's network address and a relative ID that the array internally uses to identify the disk.

A volume identifier identifies a particular volume of a disk set. Again, the prior art provides several methods for identifying volume objects, such as globally unique numbers, relative file paths (e.g. C:\), textual names, or a numerical index corresponding to the volume's relative position within the disk set.

The UFA can also define and recognize a set of well-known volume identifier values that have a special meaning. One example of a well-known identifier value is the system volume identifier. It refers to the formatted volume that contains the disk set's primary (or default) operating system. A requester can use the system volume identifier to request the UFA service to automatically locate the system volume of a disk set, and then expose it to the requester. This is convenient to the requester if it wishes to access the system volume of a disk set, but does not know the volume's identifier within this disk set (a disk set can have multiple volumes, and the relative position of the system volume can vary from one disk set to another). Another well-known identifier is the all-volumes identifier. It does not refer to a specific volume. Instead, it indicates that the requester wishes to access all the volumes that UFA finds within a disk set.

When a requester specifies a disk set containing the file systems that it wishes to access, it can optionally specify a synchronize flag indicating whether or not it requires access to the most up-to-date version of the disk set. When the synchronize flag is set, the UFA service ensures that any changes that the requester or a collaborating FPA makes to an exposed file system will eventually be visible and available to the client that owns the disk set. For example, assume that the requester copies a file to a synchronized file system. If the client is powered-on at the time of the copy operation, its software will be able to detect the new file and use it immediately. If the client is powered-off, its software will be able to detect the file the next time the client is powered on.

A potential disadvantage of synchronization is the busy files problem. It can occur if the disk set is active at the time of the UFA request, which means it is being used by the client that owns the disk set and thus needs to be shared. If a program running on the client locks a particular file, the requester can be denied access to that file. The busy files problem does not occur if the disk set is inactive, e.g., the client computer is powered-off. In that case, the UFA service gives the requester exclusive access to the disk set and its file systems. In fact, when the disk set is inactive, the UFA service ignores the synchronize flag and always gives the requester exclusive access to the disk set, which by definition is the most up-to-date version. The requester leaves the synchronize flag unset to indicate that it wishes to avoid the busy files problem at the potential expense of accessing a slightly out-of-date version of the disk set. In the case the disk set is active at the time of the request, this gives the UFA service permission to take a snapshot of disk set, and give the requester access to the snapshot instead of the active disk set.

A potential disadvantage of accessing a snapshot of the disk set is that modifications made by the requester will be applied to the snapshot only, and will therefore not affect the active disk set. This limitation is usually acceptable for requesters or FPAs that use UFA to read—as opposed to write or modify—client files.

ExportVolumes Command (First Method, FIG. 6B)

In one embodiment, a requester may call the ExportVolumes command to request the creation and export of one or more network file systems mapping to one or more formatted volumes of a disk set. One input parameter contains the disk set identifier. The command optionally includes an input parameter containing the credentials (e.g., user name and password) of a user account on behalf of which the requester is running. The service provider may use those credentials to authenticate the account and authorize or deny the command. The next input parameter is an optional synchronize flag indicating whether or not the exported network file systems are to be synchronized with the most current versions of the file systems used by the client that owns the disk set.

The next input parameter is a list of volume identifiers that specify the file systems (e.g. formatted volumes) of the disk set to be exported. As described earlier in Volume Identifiers, the requester can pass a well-known volume identifier to select a volume with special characteristics, such as the system volume. In particular, the requester can pass a single identifier with the all-volumes value to indicate that all of the file systems found on the disk set should be exported. Finally, the set of input parameters may optionally include a file sharing protocol identifier, allowing the requester to specify a preferred protocol, such as CIFS or NFS, for the exported network file system(s). The service provider is free to choose the protocol if this parameter does not exist or is not specified.

If the command is authorized and completes successfully, it returns as output parameter a list of volume descriptors, each corresponding to a volume identifier supplied by the requester. If the all-volumes identifier was specified, the list includes descriptors for all of the volumes that were found on the disk set. A volume descriptor contains a status code indicating whether the associated volume has been successfully exported. If the export was successful, the descriptor includes an identifier for the network file system mapped to the requested file system. This identifier could comprise, for example, a network file server network address and a directory path identifying the file system on that server. It may additionally contain credentials (user name and password) needed to access the network file system, if applicable. Finally, the descriptor may include a file sharing protocol identifier indicating what protocol was selected for the export. It some cases, this is unnecessary if the protocol can be implicitly derived from the network file system identifier. For instance, a network file system identifier of the form \\server name\path usually reveals that the protocol used is CIFS.

The requester or any other FPA collaborating with the requester or launched by it can then use the information to mount the file systems and access them over an IP network, provided that the computer hosting the program has a network file system driver that supports the file sharing protocol that the service provider selected.

UnexportVolume Command

In one embodiment a requester may call UnexportVolume to indicate that it is has finished using a network file system previously created by ExportVolumes. An input parameter contains the identifier for the network file system no longer needed.

ProcessFiles Command (Second Method, FIG. 6B)

In one embodiment, the ExportVolumes command enables the use of a separate data connection, e.g., the network file system, for accessing a file system of a selected disk set. The set of file operations available to users of the network file system is defined by the file sharing protocol. The ProcessFiles command, in contrast, allows files to be copied or manipulated directly over the UFA control connection.

The requester supplies the following input parameters: a disk set identifier, optional credentials for authentication and authorization, and an optional synchronize flag. Additionally, the requester supplies a list of operation selectors, each containing a volume identifier, a file path, an optional internal record identifier, an operation code, and a set of one or more flags. The volume identifier specifies the volume containing the file; the file path specifies the location of the target file within the volume; the internal record identifier identifies a particular data item contained in the file; and the operation code specifies the type of operation to be performed, for example, copy data from file, copy data to file, delete file, copy record out of file, insert record into file, etc . . . . In the case of a "copy data to file" or "insert record into file" operation, the selector also contains the data to be copied or inserted into the target file.

When the command completes, it returns as output parameter a list of operation results, each corresponding to an operation selector. Each operation result may contain a status code indicating whether the associated file or record manipulation operation was successful. If the operation was to copy data from the target file and was successful, the operation result may also contain the data read from the file.

ExecuteProgramOnVolume Command (Third Method, FIG. 6B)

This command provides the third method allowing a program to access a formatted volume of a disk set. In one embodiment, the requester supplies the following input parameters: a client identifier, optional credentials for authentication and authorization, a volume identifier, and an optional synchronize flag. The requester also supplies the location of an FPA to execute on the volume. The location can be a network path consisting of a network file system identifier and a directory path leading to the program file. Additionally, the requester can specify a string containing parameters, such as command-line arguments, to supply to the FPA at execution time. The requester optionally specifies the type of execution environment required by the FPA, such as operating system type, run-time libraries, and CPU type. Finally, the command optionally accepts as input parameter a set of credentials for a user account on behalf of which the FPA should run.

The service provider carries out the command by selecting a computer that has access to the specified file system and satisfies the FPA's execution environment requirement, and then running the FPA on that computer. The selection process and the identity of the selected computer may be transparent and hidden from the requester. When the FPA is launched, it is passed a parameter list composed of a path to the volume of interest, and the parameters that the requester passed to ExecuteProgramOnVolume. The FPA accesses the file system while it is running, and is free to communicate its results to the requester or other programs using any well known data sharing mechanism.

The command completes when the FPA finishes executing. An output parameter may be used to hold the FPA's exit status code, which the requester can inspect to determine if the FPA executed successfully.

AnalyzeDiskSet Command

In one embodiment, a requester uses this command to obtain detailed information about the configuration and contents of a disk set. The command accepts the same input parameters as the ExportVolumes command, except that there is no list of volume identifiers. If the UFA service provider successfully locates the disk set, it returns the disk set information in an output parameter. Since the amount of information may be large, the output parameter could be expressed as a list of values or a XML document.

Minimally, the information enumerates the file systems, e.g. formatted volumes found in the disk set. The information may additionally enumerate unformatted volumes, e.g. those that do not yet contain a file system. The enumerations may contain textual or numerical volume identifiers for uniquely identifying each volume within the disk set. A requester can use such identifiers to identify a particular volume of interest in a subsequent call to ExportVolumes, ProcessVolumes, or ExecuteProgramOnVolume.

In one embodiment, the configuration information can optionally include the disk set's physical composition, which means the number, types, and locations of the disks that constitute the set. For example, if a disk set contained a SAN disk residing on a disk array, the information would contain an entry for that disk, and the entry may contain the SAN address of the array and a local disk identifier that the array uses to identify the particular disk. Finally, the information can optionally enumerate software programs found to reside on the discovered file systems. This can include operating systems, drivers, application programs, and information about them (such as version and patch level, for instance).

ConfigureDiskSet Command

Unlike ExportVolumes, ProcessFiles, and ExecuteProgramOnVolume, which operate on file systems already residing on the selected disk set, the ConfigureDiskSet command allows a requester to alter the volume and file configuration of a disk set. This means that the command can be used to destroy existing file systems or volumes or both, or create new volumes or file systems or both. For instance, a requester can use this command to initialize a disk set containing blank disks. The initialization involves creating one or more volumes, and optionally formatting one or more of the new volumes, thus creating file systems.

In addition to a disk set identifier, optional credentials, and the synchronize flag, the command accepts as input parameter a description of the desired new configuration for the disk set. This description could take the form, for example, of an extensible markup language (XML) document describing the new configuration. The configuration may contain a description of the desired volume layout; for example, the logical volume format to use, the number of volumes, and the physical composition of each volume. The physical composition of a volume generally consists of a list of extents for the volume. An extent is defined as a contiguous range of sectors of a physical disk. A volume can have more than one extent, and some extents may belong to distinct disks of the disk set.

Regardless of a volume's physical composition, the volume itself appears as a linear range of sectors to upper layers of the storage stack, in particular the file system layer. For each volume listed, the configuration may also specify whether the volume is to be formatted with a file system. If a volume is to be formatted, the configuration may additionally specify the desired file system format and properties, such as name and cluster size. The UFA service may allow new volumes to be added to a disk set that already has volumes, or existing volumes to be formatted, regardless of whether they were previously formatted.

The UFA service completes the command with an output parameter that contains one or more status codes indicating whether or not the requested volume and file system changes were successful.

FIG. 6A illustrates an exemplary UFA Appliance architecture 700 in accordance with one embodiment of the present invention. Embodiments of the present invention may provide the UFA service using a UFA Appliance 700 which can be added to an existing computing environment using the example shown in FIG. 6A, and an optional set of components called UFA client agents (215, 306 and 356) installed on clients of the systems/storage application.

In one embodiment, a UFA appliance may be viewed as a group of interconnected computers composed of at least one physical computer, and zero or more virtual computers (virtual machines). If virtual machines are used, at least one of the physical computers is a virtual machine host. Every computer in the group is assigned a role, which can be either master or slave. A group has one master and one or more slaves. The master computer can also act as a slave, thus assuming both roles.

FIG. 6A shows one possible configuration for the UFA appliance 700. It may be composed of four physical computers 710, 720, 780 and 800. Physical computer 710 is the master, while all remaining computers—physical or virtual— are slaves. In addition to acting as a slave, physical computer 720 is also a virtual machine host, and hosts at least two virtual machines 740 and 760. The software stack of the master contains an operating system 712, a UFA broker 715, a database management system 713 and a database 714. The DBMS and database may optionally reside on devices external to the UFA appliance, as long as they are reachable from the UFA broker via a network.

In one embodiment, the computers that constitute a UFA appliance are not necessarily tightly coupled; they can be geographically dispersed, so long as they can communicate with each other via an internetwork. A UFA appliance can thus be formed by logically grouping an arbitrary set of diverse computers and devices. The composition of a UFA appliance can change over time, e.g., computers can be added and removed from the appliance, thereby altering the appliance's functionality and capabilities.

The software stack of every slave may contain a UFA Slave Agent (729, 747, 767, 789, 809), an operating system (722, 742, 762, 782, 802), one or more logical volume managers (725, 727, 743, 745, 763, 765, 785, 787, 805, 807), one or more file system drivers (726, 728, 744, 746, 764, 766, 786, 788, 806, 808), zero or more network file system servers (730, 731, 790, 791, 810, 811), and zero or more programs capable of decoding various file data formats. Each LVM, file system driver, operating system and program is capable of decoding and processing one or more specific volume, file system, or file data formats. Similarly, each network file system server supports a specific file sharing protocol, such as CIFS or NFS. The database 714 may contain information about the composition of the UFA appliance. This information contains the list of computers constituting the appliance, and for each computer: the computer type (physical, virtual, or virtual machine host), the available LVM formats, the available file system formats, and the available file sharing protocols, as determined by the LVMs, FSDs and network file servers present on the computer. When the UFA broker software 715 is started, it loads the database contents into its memory. The broker updates both its memory and the database whenever the software stack of a slave computer is updated, or when a computer is added or removed from the appliance.

In one embodiment, the UFA broker 715 also stores in its memory information about the managed computers and devices of the computing environment in which the UFA appliance participates. This information can be obtained via several means. It can be queried from an existing systems/storage management server, such as SM server 412; automatically determined by scanning devices of the IP network and SAN networks; specified as list in a configuration file; or manually entered by a user or administrator. Once the information is obtained, it may be stored or cached in database 714 for fast retrieval the next time the UFA broker restarts.

The UFA broker 715 provides the UFA service to requesters external to the UFA appliance 700. When a requester requests access to a file system of a disk set, either directly through a network file system (ExportVolumes), or indirectly by running an FPA on the selected volume (ExecuteProgramOnVolume) or manipulating files over the control connection (ProcessFiles), the UFA broker must find or construct a data path and storage stack capable of exposing the file system to the requester or FPA. In one example, the UFA broker 715 first decides whether the stack should be provided by a client computer or a UFA slave. If the disk set is active, e.g. is currently being used by a powered-on client computer, the decision is based on the synchronize flag specified by the requester. More specifically, the client computer is selected for providing the storage stack if the synchronize flag is set.

A UFA slave provides the storage stack if the disk set is inactive. A slave is also used if the disk set is active but the synchronize flag is unset, in which case an inactive disk set snapshot is created from the active disk set, and then exposed to the requester through the slave.

As discussed, a requester sets the synchronize flag to request access to the most current, e.g. up-to-date version of a client's file system/volume. The client computer itself is selected for providing the storage stack if the synchronize flag is set and the client computer is active at the time the UFA broker 715 processes the request. The logic can be explained as follows. Since the client is running, it is accessing the file system using its own storage stack, whose state is stored in the client computer's memory. The file system exposed by the top of the client's storage stack is the most current version, by definition.

It is generally unsafe for two separate storage stacks to simultaneously access the same set of volumes and disks. This is because most logical volume managers and file system drivers assume that there is only one instance of the storage stack in memory. If, for example, two separate computers access a shared disk using their own stacks, the FSD of one stack may be unaware of the FSD in the other stack and could interfere with it, potentially causing corrupt data to be written to disk and inflicting damage to the file system(s).

A safe way for accessing or sharing an active client's file system is through the client's own storage stack. For instance, the most common way of sharing a client's file system is to expose it through a network file system, as discussed earlier. A network file system server can be viewed as an additional layer on top of an existing storage stack. Since the local volume and file system layers still control access to the disk device(s), there is no interference from parallel stacks. For this safety reason, after receiving a UFA command having the synchronize flag set and targeting a file system of a disk set of an active client computer, the broker 715 requests the client itself to service the command. This is achieved by forwarding the command to an agent running on the client. This agent could be UFA-aware, like the UFA client agents labeled 215, 306, and 356 in FIG. 6A, in which the file system access command can be sent to the agent with no or few modifications.

In the absence of a UFA client agent, the UFA broker 715 can alternatively translate the UFA command into one or more equivalent operations that other agents present in the client can understand. These agents could include systems/storage management agents, computer management modules embedded within the client's operating system (such as the Windows Management and Instrumentation component of Windows operating systems), or virtual machine guest agents included with virtual machine products.

The UFA broker 715 can keep in its database 714 a list of available agents for each known client. The broker 715 can also probe a client as needed to determine what agents are available, and what their capabilities are. Most agents respond to inquiry commands sent to specific software-based network ports, such as TCP/IP ports, and can thus be detected and identified in this manner. If a client computer does not include agents capable of servicing one or more UFA file system access commands, the UFA broker could automatically upload a UFA client agent to the client computer, using the software download and installation capabilities of an agent already present on the client, such as a systems/storage management agent. A user or administrator can optionally install the UFA client agent on client machines using a manual or automated software installation mechanism.

Figure 7:
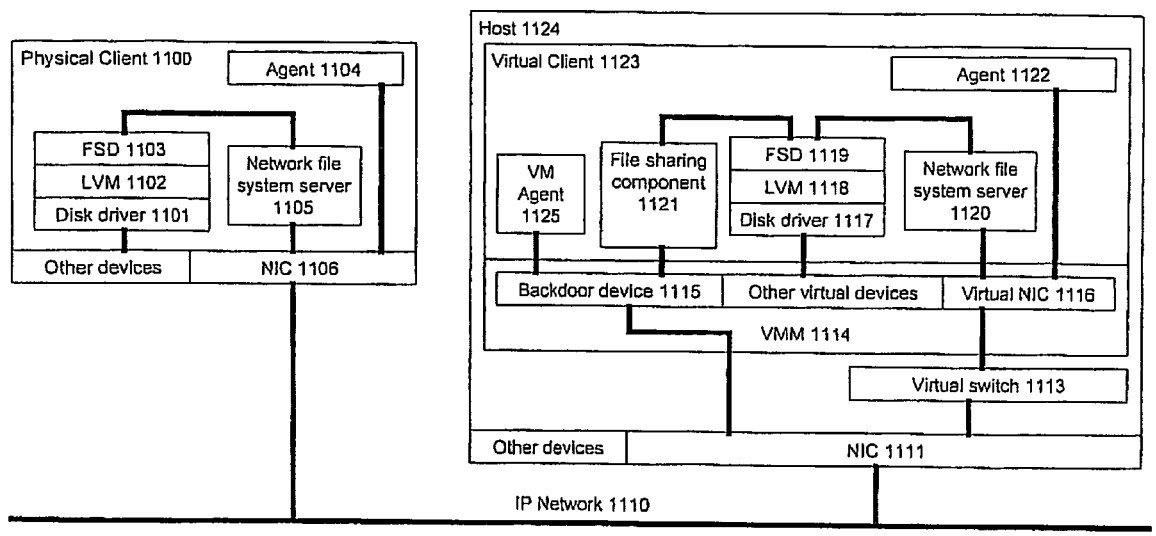
FIG. 7 illustrates a mechanism by which the UFA broker can expose a file system belonging to a physical client, in response to an ExportVolumes command in accordance with an embodiment of the present invention.

FIG. 7 illustrates how the UFA broker can expose a file system belonging to a physical client 1100, in response to an ExportVolumes command in accordance with one embodiment of the present invention. The UFA broker may send a command to an agent 1104 running on the client 1100, instructing it to export the file system exposed by file system driver 1103 as a network file system. The agent 1104 may carry out the request by instructing network file system server 1105 to map a network file system from the local file system, and export it to other computers on IP network 1110 through a network interface card 1106.

If a UFA requester invokes the ExecuteProgramOnVolume command on the client instead of ExportVolumes, the UFA broker attempts to find an agent capable of downloading the specified FPA over the IP network to the client 1100, and locally executing the FPA on the client.

FIG. 7 also illustrates the case of a virtual client 1123 hosted on a physical host 1124. The virtual machine can be connected to the IP network through a virtual NIC 1116, a virtual switch 1113, and a real NIC 1111. The virtual NIC and switch are standard components of most modern virtual machine software products. The UFA broker can treat a virtual client as any physical client, and send client-side UFA commands to an agent 1122 in order to export a network file system (through network file system server 1120) or download and run an FPA.

The UFA broker may also take advantage of an alternate means for exporting a file system of a virtual client, one that does not require communication through a virtual NIC. Modern virtual machine software products typically include guest components that a user or administrator can install in every virtual machine's software to take advantage of capabilities unique to virtual machines. Those guest components generally consist of a virtual machine agent 1125 and one or more submodules. A common submodule is a file sharing component 1121. Guest components are usually designed to communicate with the underlying VMM or external virtual machine management application through a channel that uses a special-purpose backdoor device 1115 instead of the virtual NIC 1116. This allows the communication to take place even if the virtual machine is not equipped with a virtual NIC, or has a virtual NIC that is improperly configured in software. The backdoor device is generally guaranteed to be present, and uses a simple communication protocol, thereby ensuring that the communication can be established and made reliable.

The UFA broker can thus forward commands to a virtual client's VM agent 1125, instructing it to export a file system through a file sharing component 1121, download and execute an FPA, or transfer files, provided that the VM agent supports such commands. The commands can be sent over a real IP network 1110 and routed to the backdoor device through physical NIC 1111 and virtual machine monitor 1114. The VM-specific file sharing component 1121 is similar to a network file server 1120 in that it exports one or more file systems provided by file system driver 1119. It differs in that it may output the exported file systems through a backdoor device instead of a virtual NIC. A file system exported in this manner can be made available over the IP network 1110 through VMM 1114 and physical NIC 1111.

In summary, in order for a UFA requester or FPA to access the current version of a file system belonging to an active client, the UFA broker may determine the agents available on the client, evaluate their capabilities, optionally upload and install a UFA client agent to the computer as needed, and send commands to a selected agent to carry out the requested command. The IP network is generally used as the channel for communication and data transfer. In the client itself, UFA commands and file data are sent through a NIC or a virtual backdoor device.

The storage stack is provided by a UFA slave computer under these situations: (1) the disk set is inactive; or (2) the disk set is active, but the synchronize flag is unset. Further, the disk set is inactive if it is (1) the disk set of a powered-off client computer, or (2) a snapshot not being accessed by any computer.

When the disk set is active, e.g. belongs to a powered-on client, and the synchronize flag is unset, it means that the requester has given UFA permission to take a snapshot of the disk set and expose the snapshot—instead of the active disk set—to the requester. Once the snapshot is taken, the client's software continues to access the active disk set, allowing a proxy computer to access the snapshot without interference from the client.

In the two cases discussed above, the final disk set to be exposed the requester is not being accessed by any computer, and thus is inactive by definition. Some proxy computer is needed to construct the necessary storage stack for exposing the disk set's file systems, and therefore the UFA broker selects one of its UFA slave computers as the proxy.

Source disks are used herein to denote the disks that constitute the disk set. In order for a slave to be eligible for selection, a data path from the source disks to the slave's UFA agent must exist, and there must also exist a suitable set of disk drivers, logical volume managers, and file system drivers for decoding the storage stack layers along the path leading to the file systems of interest to the requester. Additionally, if the requester has requested to access the internal records of a file, a slave must also contain an operating system or other program capable of decoding the file's data format in order to be eligible.

The data path is a function of the type of source disks and the type of the slave computer. A source disk can be a physical disk, a file residing on a local file system, or a file residing on a network file system. A slave can be either physical or virtual. Therefore, this leads to six possible data path permutations (FIG. 8A through FIG. 8F).

Figure 8A:
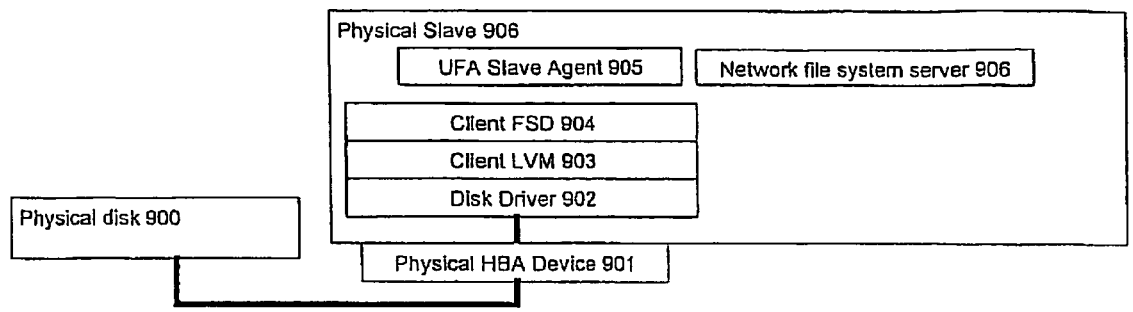
FIGS. 8A and 8B illustrate the two possible data paths when a source disk is physical in relation to use of a storage stack provided by a UFA slave in accordance with one embodiment of the present invention.
Figure 8B:
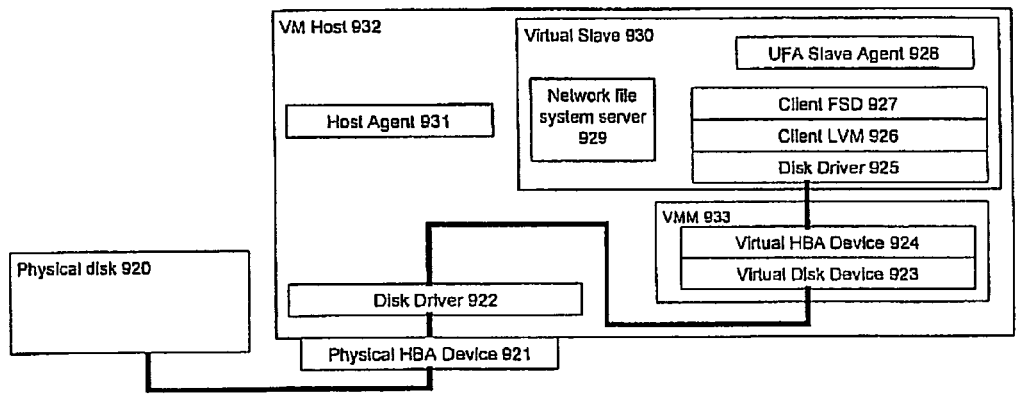

FIG. 8A and FIG. 8B illustrate the two possible data paths when a source disk is physical. The client can be a physical computer or a virtual machine that uses a physically mapped, e.g. raw, disk. If a slave is a physical computer 906, it may be eligible if it has a host bus adapter 901 connected to the disk's bus, and its software stack includes a client LVM 903 and client FSD 904 that are compatible with the volume and file system formats used on the disk 906.

In one embodiment, a slave that is a virtual machine 930 and hosted by a physical computer 932 may be eligible if the host has a host bus adapter 921 connected to the disk's network, and the slave's software stack includes a client LVM 926 and client FSD 927 that are compatible with the volume and file system formats used on the physical disk 920. The guest software running in the virtual machine does not access the physical disk directly. It accesses a virtual disk 923 using a disk driver 925 through a virtual HBA 924. The virtual machine monitor 933 maps the virtual disk to physical disk 920 through a host disk driver 922 and the host's HBA. If a client file system uses a volume that spans more than one physical disk, the same slave eligibility requirements apply to all the disks that constitute the volume.

Figure 8C:
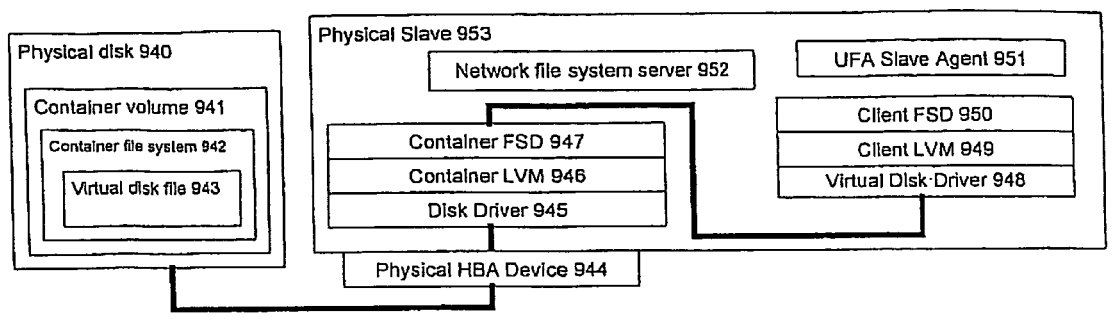
FIGS. 8C and 8D illustrate the cases where a client disk is a virtual disk mapped to a file residing on a local file system in accordance with an embodiment of the present invention.
Figure 8D:
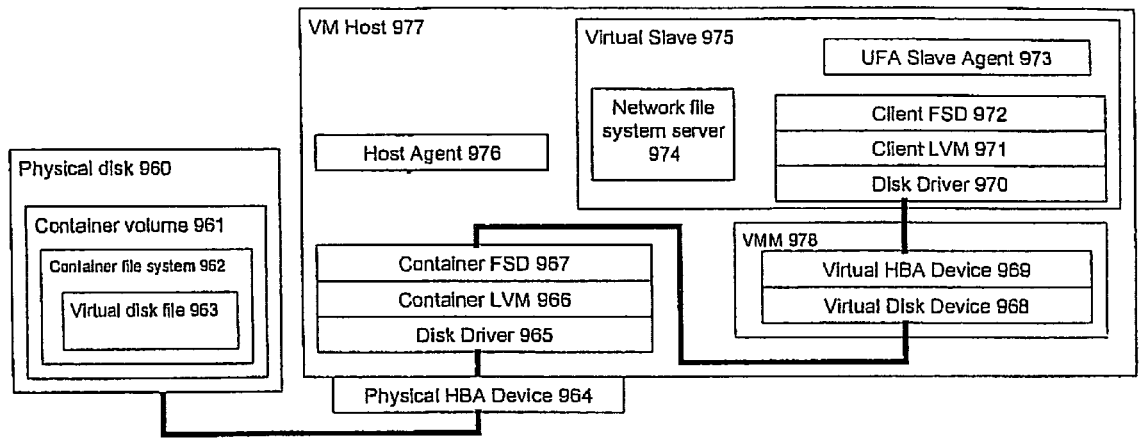

FIG. 8C and FIG. 8D illustrate the cases where a client disk is a virtual disk mapped to a file residing on a local file system. Accessing the file systems within the virtual disk requires decoding two storage stacks: the container stack and the client stack. Assume, for instance, that virtual disk file 943 resides on container file system 942, is formatted on top of volume 941, which is composed of at least one physical disk 940. If a slave is a physical computer 953, it may be eligible if it has a host bus adapter 944 connected to the same bus as physical disk 940, and its software includes a LVM 946 capable of decoding volume 941, and a FSD capable of decoding file system 942 in order to access the virtual disk file 943.

In addition to the container storage stack, the client storage stack is decoded in order to access the client file system(s). The slave's software should therefore include a LVM 949 and a FSD 950 that are compatible with the volume and file system formats used on virtual disk 943. Establishing a functional data path involves finding a way to connect the two storage stacks. While virtual disk 943 is a file, the LVM 949 expects its lower software interface to be a disk-oriented interface, not a file-oriented interface. The slave may use virtual disk driver 945 to solve this problem. A virtual disk driver can make a file appear as a disk by mapping the file's contents to a linear sector representation of a disk, and exposing that representation to LVMs, just like ordinary disk drivers. Any well known design and implementation of virtual disk drivers may be used.

In one example, a virtual disk driver may not be needed if the slave computer is a virtual machine 975 running on a host 977. To be eligible, the slave should run on a host equipped the necessary LVM 966 and FSD 967 for decoding the container storage stack. The slave's guest software must also include an LVM 971 and FSD 972 capable of decoding the client storage stack. Virtual machine monitor 978 connects the virtual disk file 963 to the LVM 971, by mapping the file 963 to the virtual disk 968, which the guest software can access through the virtual HBA 969 using disk driver 970.

It is possible for virtual slave 975 to be powered on and running before it is selected to handle a particular client disk, or group of client disks. Some modern virtual machine monitors allow a disk to be dynamically added to or removed from a running virtual machine. Embodiments of the present invention can take advantage of this capability and add a virtual disk, such as virtual disk 968, to the virtual HBA 969 of running virtual machine 975, to create a data path on demand, as needed.

Once again, if a client file system uses a volume that spans more than one physical disk, multiple data paths may be established, one for every disk constituting the volume.

Figure 8E:
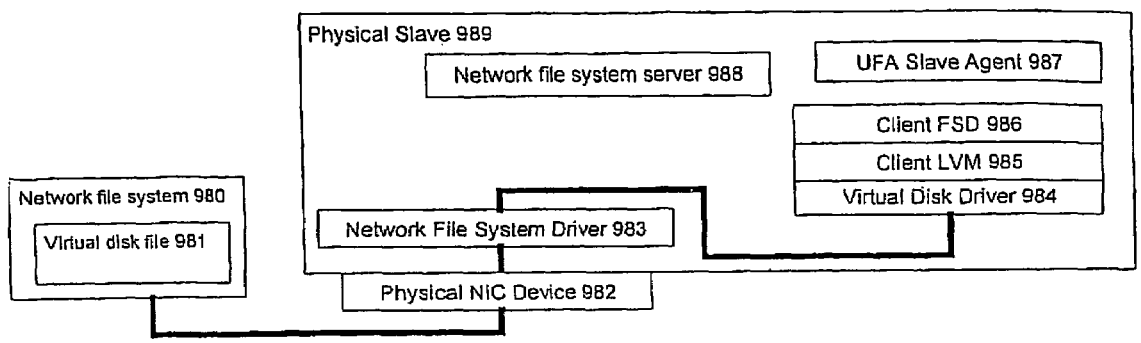
FIGS. 8E and 8F illustrate the cases where the client disk is a virtual disk file residing on the network file system in accordance with an embodiment of the present invention.
Figure 8F:
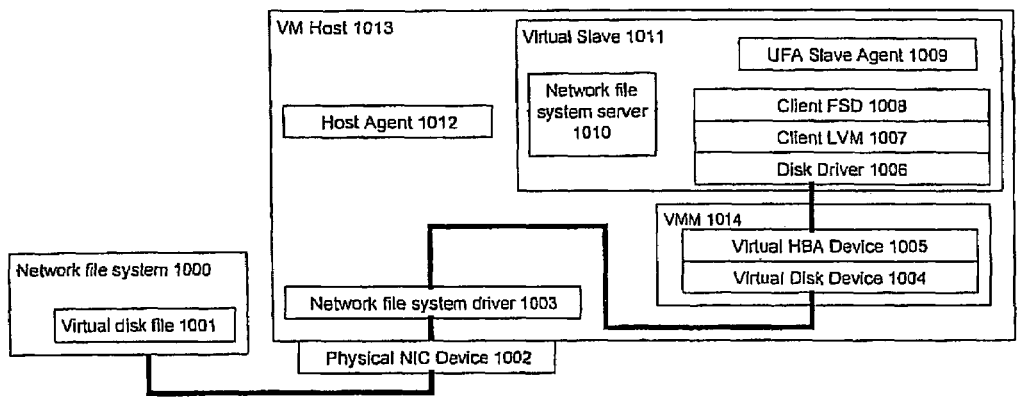

FIG. 8E and FIG. 8F show the case where the client disk is a virtual disk file residing on the network file system. The data paths connecting file 981 to physical slave 989 and file 1001 to virtual slave 1011 are similar to those shown in FIG. 8C. The difference is that the container storage stack is much shallower, since a network file system exports a file system-oriented interface, and so a container LVM and FSD are not required. The software of physical slave 989 or physical host 1013 should, however, include a network file client 983/1003 that is compatible with the file sharing protocol exposed by network file system 980/1000 in order to access the file 981/1001.

The following describes in detail how the UFA broker responds to each UFA service command in accordance with embodiments of the present invention.

Response to ExportVolumes

As discussed, a requester calls ExportVolumes to access one more formatted volumes of a disk set through the network file system method. In addition to a disk set identifier, the requester can pass credentials of a user account for authentication, in case the broker requires it. The requester also passes a list of volume identifiers specifying one or more file system to export. The list can consist of a single identifier with the all-volumes value, indicating that all file systems found on the disk set are to be exported.

If the UFA system implements command authorization, the broker first authenticates the user account and authorizes or denies the request based on the requester's identity. Authentication can be performed using a wide range of technologies available to those skilled in the art, including, for example, a computer directory service.

After authorizing the command, the UFA broker enters an information gathering phase during which it determines the disk set's existence and configuration information from multiple possible sources. The configuration information of a disk set includes one or more of the following:

The physical composition of the set, e.g. the number, identifiers locations, and types of disks that constitute the set. For example, the information for a physical disk residing on a SAN disk array might include the array's network address and the local disk identifier that the array internally uses to identify the disk. The information for a virtual disk might include its mapping type (file vs. physical disk) and its location.

The software inventory, e.g., the type(s) of software known to reside on the disk set's file system(s). Systems, storage, and virtual machine management applications typically associate metadata or tags with disk sets to store information about the disk set's software. For instance, virtual machines and virtual machine snapshots typically have a configuration file containing a field describing the type and version of operating system known to be installed in the VM's disks.

The number, types, and characteristics of volumes or file systems known to reside on the disk set.

The UFA broker first consults its own database 714 to see if it contains a previously cached copy of the configuration information for the disk set. If the information is not present, the broker queries one or more systems/storage/VM management applications (such as SM server 412) known to be present in the managed computing environment.

If the information cannot be determined from management applications, the UFA broker attempts to determine at least the disk set's physical composition from the disk set identifier itself. If, for example, the identifier is a list of individual disk identifiers (see previous paragraph Disk Set Identifiers), the type and location of the disks can generally be determined by inspecting the form and contents of the identifiers themselves. If the UFA broker cannot find the disk set, or is unable to obtain its configuration information, the broker completes the command with an error status. If the information is successfully obtained, the broker optionally caches it in its database 714 for future reference.

The broker next determines or estimates the set of volume formats and file system formats that will need to be decoded and processed to access the disk set's contents. This task is trivial if the disk set configuration information includes complete file system information for every formatted volume. If for any reason the file system information is missing, the broker can estimate which formats will be needed based on the disk set's operating system type(s). This estimation is fairly accurate in practice, since an operating system of a particular type tends to use volumes and file systems of predictable formats. For instance, Windows 2000 operating systems tend to use the NTFS file system format. If the OS type cannot be determined, the broker might resort to a default type that can be manually configured by the UFA administrator, or automatically determined using heuristics and statistics.

Based on the value of the synchronize flag and the disk set state (active or inactive), the UFA broker determines whether the storage stack for accessing the requested volumes should be provided by a client computer or a UFA slave, according to the decision process described in UFA Broker. In particular, if a UFA slave is needed to provide the stack, it is selected based on its compatibility with the required formats, and other criteria as described earlier in Storage Stack Provided by UFA Slave. Once a provider is selected, an agent on the provider is selected for carrying out the network file system export operations. If the provider is a UFA slave, the agent used is always the UFA slave agent. If the provider is a client computer, the agent can be a UFA client agent, or one or more non-UFA agents, as explained next. The following paragraphs describe the two cases in more detail.

If the disk set belongs to an active client and the synchronize flag is set, the client computer itself is selected for providing file system access.

The broker attempts to find an agent on the provider capable of exporting network file systems. It first enumerates the agents available on the client using one of two methods:

Obtain agent information from the software inventory of the disk set configuration information previously determined.

Probe the client computer to detect what agents are installed, using the methods described in Storage Stack Provided By Client Computer. First check for the presence of a UFA client agent. If not present, check for alternate agents, such as SM agents and agents included with the OS.

If no agent capable of carrying out the network file system export command exists, the broker optionally uploads and installs a UFA client agent onto the client using the remote software installation services of a management application. By design, the UFA client agent is guaranteed to support the provider-side operations needed by the UFA broker.

In the remaining cases, a UFA slave computer serves as the storage stack provider.

If the synchronize flag is unset and the disk set belongs to an active client, the UFA broker prepares to create a temporary snapshot of the disk set. The broker first looks up the disk set's physical composition from the configuration information, and then finds a controller that can manage the set's disks, based on the types and locations of the disks. The controller could be a storage device (such as a disk array), a systems/storage management application that manages storage devices, or virtual machine software, in case the disk set is composed of file-based virtual disks.

Once the UFA broker identifies an appropriate controller, it sends a command to controller to create a snapshot of the disk set. The operation could consist of a single snapshot command for the entire set if the controller supports it, or multiple commands for each of the set's disks.

In one embodiment, the controller optionally communicates with agents running on the client to quiesce file systems and applications just before the snapshot is taken. In either case, the controller returns an identifier for the newly created snapshot. Once the temporary snapshot is created, it can be used as a disk set that is independent of the one being accessed by the active client.

The UFA broker then constructs a set of eligible UFA slave computers based on their data path connectivity and their ability to process the required volume and file system formats, using the decision process described in Storage Stack Provided by UFA Slave. The broker then selects one of the eligible slaves to manage the data path and storage stack. Several criteria can be used for the selection. The broker could, for example, periodically poll its slaves to monitor their activity, and select the most lightly loaded one to carry out the UFA request. If both virtual and physical slaves or eligible for a particular disk set, the UFA broker could also select based on a preference for one computer type over the other. The broker can also keep track of which slaves are already being used to process disk sets involved in other UFA commands, and possibly avoid those slaves.

The selection of a slave results in one of six possible data paths, depending on the type of the source disks and the slave computer, as illustrated in FIGS. 8A-8F. Though the physical segment of the chosen data path may exist, it might need to be enabled by the various storage devices and switches along the path. For example, FIG. 8B shows a possible physical data path between a physical disk 920 and the HBA 921 of a physical computer hosting a virtual slave computer. If the disk resides on an array and the connection bus is a SAN, then the array, the SAN switches residing on the path, and the HBA have to be configured to enable the path, e.g., to make the disk visible and accessible to the HBA.

The UFA broker's first step in establishing the data path thus involves programming the various devices on the physical segment of the data path to enable it. The devices can be programmed directly by sending them commands over their control interface. They can also be programmed indirectly by sending requests to a systems/storage management application, such as SM server 412 in FIG. 5.

The second step involves configuring the software segment of the data path. The UFA broker communicates with the slave's software through the slave's UFA slave agent. If the slave is a virtual machine, the UFA broker may also communicate with the virtual machine's host through the virtual machine host agent or virtual machine monitor managing that virtual machine. The software operations usually consist of one or more mount operations. A mount operation generally starts with a notification of the presence of a storage device or object, and is followed by the construction of a storage stack from the device or object.

It is appreciated that the following discussion and its examples assume a disk set consisting of a single source disk.

If the source disk 900 and slave 906 are both physical, as illustrated in FIG. 8A, the UFA broker instructs slave agent 905 to mount the disk. The process that the slave agent uses to carry out the mount request generally depends on the operating system running on the slave computer. The process may involve sending a message to the OS or its HBA disk driver 902 to detect and process the disk. Some operating systems and/or drivers can automatically detect the presence of new disk made visible on the bus.

The construction of a storage stack consisting a volume layer and file system layer follows. Again, depending on the operating system, the construction may be automatic, or may need to be orchestrated by the slave agent by sending mount requests to the logical volume manager 903 and file system driver 904. If the source disk is physical but the slave is virtual, as illustrated in FIG. 8B, the UFA broker requests the virtual machine monitor 933 of physical host 932 to add a virtual disk 923 to the slave 930 and map it directly to the physical disk 920 through physical HBA 921. The broker then sends the mount request to the slave agent 928 running in the virtual machine. The storage stack (925, 926, 927) is then constructed in the virtual machine. If the source disk is a file 943 residing on a volume 941 formatted with file system 942 and contained in physical source disk 940, and the slave is a physical computer 953, two storage stacks must be created, as FIG. 8C illustrates. The slave agent 951 mounts and processes the first stack (945, 946, 947) in a way similar to FIG. 8A. This stack makes the virtual disk file 943 accessible to programs running on the slave, including the slave agent. The slave agent then instructs virtual disk driver 948 to mount the file as a disk, resulting in the construction of the second storage stack (948, 949, 950), exposing the virtual disk's file system (s) to the slave agent.

If the source disk is a file 963 residing on a volume 961 formatted with file system 962 and contained in physical source disk 960, and the slave is a virtual machine 975, two storage stacks must be also be created. The UFA broker first requests the virtual machine host agent 976 or virtual machine monitor 978 to mount the physical disk 960 and construct a storage stack (965, 966, 967) for it, thereby exposing the file 963. The UFA broker then requests the VMM to add a new virtual disk 968 to VM 975, and map it to file 963. Finally, the UFA broker instructs the slave agent to mount the virtual disk and construct a storage stack (970, 971, 972) for it, thereby exposing the virtual disk's file systems.

If the source disk is a file residing on a network file system, as illustrated in FIGS. 8E and 8F, the disk mounting and storage stack construction process is similar to that described above, with the difference that the first storage stack only includes one layer, and is provided by a network file system driver (983, 1003). The network file system driver exposes the virtual disk file, which can then be mounted using virtual disk driver 984 on physical slave 989, or mapped to a newly created virtual disk 1004 for virtual slave 1011.

If the disk set selected by the requester is inactive, then there is no need to create a new snapshot. The disk set is inactive if it belongs to a powered-off client, or if it is a snapshot. In both cases, it is connected to the selected UFA slave using one of the six data paths described above.

In one embodiment, the broker always selects the UFA slave agent of a slave to carry out the network file system creation operations. Once the disk set is fully mounted in the storage stack provider, and a valid agent on the provider is selected, the UFA broker iterates through the list of volume identifiers passed by the requester. For each identified volume, the broker instructs the agent to request a network file server running in the slave to export the identified volume, if formatted, using the network file sharing protocol specified by the requester. The agent then returns an identifier for the exported network file system, and an optional user account and password for mounting it.

If the list of volume identifiers contains a single entry with the all-volumes value, the broker instructs the agent to export all file systems found on the mounted disk set, and to return network file system identifiers for all of them. If an entry contains the system volume identifier special value, the agent determines which of the disk set's file systems contains a primary operating system, and then exports that file system. A system volume can be found by searching for particular files and directories known to belong to a specific operating system type. Some disk sets also contain a special boot loader configuration file or data fragment that contains a reference to the system volume. The agent can thus find the system volume by locating and reading that file. For example, the boot loader file of disk sets initialized by Microsoft operating systems is generally named "boot.ini."

The broker aggregates the network file system identifiers and credentials returned by the agent(s) into a list of volume descriptors, then passes the list back to the requester when completing the ExportVolumes command. The details of how the network file systems were created and exported may be transparent to the requester. When ExportVolumes returns, the requester has a list of network file system identifiers (and optional credentials, if applicable) that it can use to mount the file systems over an IP network. The requester can also pass the identifiers and passwords to another program, such as an FPA, allowing it to mount the network file systems, provided that the computer hosting the program has a network file system driver that supports the file sharing protocol used.

Once a network file system is mounted on a particular computer, the computer's software can access, manipulate, create, and delete files and directories using a rich command set supported by the file sharing protocol used.

Response to UnexportVolume

A requester calls UnexportVolume to indicate that it is has finished using a network file system previously created by ExportVolumes. An input parameter contains the identifier of the network file system no longer needed.

For every disk set processed by ExportVolumes, the UFA broker keeps track of the disk set's exported file systems that are still in use. When a requester calls UnexportVolume for a particular network file system, the broker marks that file system as unused. When the number of used file systems drops to zero, it is an indication that the resources used to expose the disk set can be freed. The UFA broker then works with the storage stack provider and its agent to coordinate a clean-up process that undoes the steps of the corresponding ExportVolumes command. The process can involve canceling network file system exports, tearing down storage stacks, unmounting volumes and disks, and possibly reconfiguring SAN devices to disable the data path used.

If the disk set used was a temporary snapshot, the UFA broker may either delete the snapshot or keep it for some amount of time, according to policies that a human administrator can configure. The deletion operation generally involves sending a delete command to the same controller that was used to create the temporary snapshot.

Response to ProcessFiles

As discussed above, a requester calls ProcessFiles to manipulate or copy a set of files or file records directly over the UFA control connection. Similarly to the ExportVolumes command, the requester passes as input parameters a disk set identifier, optional user account credentials, and a synchronize flag. Additionally, the requester supplies a list of operation selectors, each containing a volume identifier, a file path, an optional file record identifier, an optional file data format type, an operation code, and a set of one or more flags. The volume identifier specifies the file system containing the file of interest, while the file path specifies the location of the file to be manipulated. The record identifier identifies a particular record within the specified file. As described earlier, accessing a file's internal record may require a program or OS capable of decoding the file's data format. The file data format type, if specified, explicitly states what the format is, so that the UFA broker can locate the appropriate program and slave. If not specified, UFA broker attempts to determine the format based on the file's name, which is contained in the file path. The operation code specifies the type of operation to be performed, for example, copy data from file/record, copy data to file/record, or delete file/record. In the case the of a copy data to file operation, the selector may contain the data to be copied to the target file.

The UFA broker authorizes the command and determines the configuration information for the disk set in the same manner as it does for ExportVolumes. Based on the disk set type and the synchronize flag, the UFA broker selects a storage stack provider and an agent on the provider using the same decision process as the one used for ExportVolumes. If the ProcessFiles request includes a file record identifier, the slave selection is further narrowed to include only those slaves containing an operating system or program capable of decoding the file's data format. If the disk set refers to an active client computer and the synchronize flag is unset, the UFA broker creates a temporary snapshot of the client's disks, then connects the snapshot to a selected UFA slave computer.

For each operation selector in the list supplied by requester, the broker translates the file operation into a command that the client agent or UFA slave agent can understand, sends the translated command, and waits for a reply from the agent. The reply contains a status indicating whether the operation succeeded. In addition, it may contain data read from a file or record, if the specified operation was a read-file or read-record command. The ProcessFiles command completes when all file/record operations have completed. The broker aggregates the replies from agents into a list of operation results, and returns the list to the requester.

A cleanup phase is needed when a UFA slave is used to access the files. After completing the ProcessFiles command, the UFA broker deconstructs the storage stacks and optionally disconnects the data path between the snapshot and the slave, as described in Response to UnexportVolume. If a temporary snapshot was used, it may be deleted at as part of the cleanup process.

Response to ExecuteProgramOnVolume

As discussed, this command provides the third method allowing a program to access a client's file system. The requester supplies the following input parameters: a client identifier, optional credentials for authentication and authorization, a volume identifier, an optional execution environment specifier, and an optional synchronize flag. In addition, the requester supplies the location of an FPA to execute on the volume. The location can be a network path consisting of a network file system identifier and a directory path leading to the program file. Additionally, the requester can specify a command-line string to supply to the FPA at execution time. Finally, the command optionally accepts as input parameter a set of credentials for a user account on behalf of which the FPA should run.

The UFA broker authorizes the command and determines the configuration information for the disk set in the same manner as it does for ExportVolumes and ProcessFiles.

Based on the disk set type and the synchronize flag, the UFA broker selects a storage stack provider and an agent on the provider using a decision process similar to the one used for ExportVolumes and ProcessFiles. An additional criterion used during slave selection is compatibility with the execution environment specified by the requester. If the disk set refers to an active client computer and the synchronize flag is unset, the UFA broker creates a temporary snapshot of the client's disks, then connects the snapshot to a selected UFA slave computer.

If the selected agent on the provider is capable of carrying out the ExecuteProgramOnVolume command or a simplified version of it, the UFA broker forwards the command directly the agent. In this case, the agent loads the specified FPA into the storage stack provider's memory, executes it, and then reports the FPA's completion status back to the broker. Otherwise, the UFA broker may decompose the ExecuteProgramOnVolume command into simpler command primitives that the agent supports. For example, the broker can send a first command to copy the FPA to a temporary location on the provider, then a second command for executing the local copy (which involves loading the program into memory), and a third to delete the temporary program file after the FPA finishes executing.

When an FPA is launched, it generally expects to receive input parameters expressed as a command line composed of one or more arguments. An FPA, by definition, processes files, so one of its command-line arguments is typically the path of a folder or volume containing the files to process. Additional arguments can specify options that can adjust the FPA's behavior. The command line that the agent supplies to the FPA at launch time is constructed by inserting the selected volume's local path into a predefined position within the command line supplied by the requester. The local path is the mount point for the selected volume and is generally not known until it is mounted in the storage stack provider.

Example: assume that the FPA is the Unix find utility. A possible command line argument for find is: "find -a name path", where "name" is the name of a file to search for, and "path" is the path of a folder or volume to search. The UFA service can define a special character sequence to indicate the position within the command line to insert the local volume path. This sequence could consist of the characters "%% VOLUME %%". In this case, the requester passes "find -a name %% VOLUME %%" as the command line string. Assuming that the selected volume is mounted on a directory X:\ in the storage stack provider, the agent replaces the special character sequence with the actual path of the mounted volume, resulting in the string "find -a name X:\", and then passes the transformed command line to the FPA.

Finally, the UFA broker reports the FPA's completion status back to the requester, allowing it to determine whether the program ran successfully.

A cleanup phase is needed when a UFA slave is used as the storage stack provider. After completing the ExecuteProgramOnVolume command, the UFA broker deconstructs the storage stacks and optionally disconnects the data path between the snapshot and the slave, as described in Response to UnexportVolume. If a temporary snapshot was used, it may be deleted at as part of the cleanup process.

Response to AnalyzeDiskSet

A requester uses this command to obtain detailed information about the configuration and contents of a disk set. The command accepts the same input parameters as ExportVolumes, except that there is no list of volume identifiers.

The UFA broker authorizes the command and determines the configuration information for the disk set in the same manner as it does for ExportVolumes.

Based on the disk set type and the synchronize flag, the UFA broker selects a storage stack provider and an agent on the provider using the same decision process as the one used for ExportVolumes. In particular, if the disk set refers to an active client computer and the synchronize flag is unset, the UFA broker creates a temporary snapshot of the client's disks, then connects the snapshot to a selected UFA slave computer.

A portion of the information to be returned to requester is derived from the preparation phase. This includes, for example, the disk set's physical composition, and possibly the type of operating system known to be installed in the disk set. However, the broker takes advantage of the fact that the disk set's file systems are mounted in the selected storage stack provider to perform a much deeper analysis, allowing it to gather information that is more complete and precise than the one derived from the preparation phase.

The broker sends one or multiple requests to the agent on the provider in order to scan the file systems to determine some or all of the following information:

Volume and file system details such as type, path or drive letter, label, globally unique identifier, total size, used space, and free space.

The exact type, version, and patch level of any installed operating systems.

A list of installed software programs, including their version

Any other information that the UFA service deems useful to the requester

After gathering the information from the agent(s), the broker aggregates it into a single output parameter which could be expressed as a list of values or an XML document, and then completes the command. A cleanup phase is needed when a UFA slave is used as the storage stack provider. After completing the AnalyzeDiskSet command, the UFA broker deconstructs the storage stacks and optionally disconnects the data path between the snapshot and the slave, as described in Response to UnexportVolume. If a temporary snapshot was used, it may be deleted at as part of the cleanup process.

Response to ConfigureDiskSet

As discussed, a requester uses this command to alter the configuration of a disk set. Volumes can be added or destroyed, and may be formatted or reformatted, which allows the creation of new file systems. In addition to a disk set identifier, optional credentials, and the synchronize flag, the command accepts an input parameter that describes the desired new configuration. This description is potentially large and complex, since it may contain multiple volume and file system specifications, with each specification possibly including volume or file system specific properties, such as a format specifier and a name.

The UFA broker authorizes the command and determines the current configuration information for the disk set in the same manner as it does for ExportVolumes, ProcessFiles, and ExecuteProgramOnVolume.

Based on the disk set type and the synchronize flag, the UFA broker selects a storage stack provider and an agent on the provider using the same decision process as the one used for ExportVolumes and ProcessFiles. The decision process for selecting a storage stack provider is identical to that for the other UFA commands because the same criteria apply. Specifically, the provider's software must include LVMs and file system drivers capable of creating and formatting the volumes and file systems referenced in the new configuration specified by the requester.

If the disk set refers to an active client computer and the synchronize flag is unset, the UFA broker creates a temporary snapshot of the client's disks, then establishes a data path between the snapshot and a selected slave computer.

If the selected agent on the provider is capable of carrying out the disk set reconfiguration command in its entirety, the UFA broker forwards the command directly the agent. This is what happens when the agent is a UFA slave agent or a UFA client agent.

If the agent incapable, as can be the case when the provider is an active client computer not equipped with a UFA client agent, the UFA broker decomposes the command into a sequence of smaller and simpler command primitives, then sends the primitives to the agent, or possibly to multiple agents on the client computer.

For example, most operating systems have a format utility that creates a file system of a selected format on a selected volume. If the provider has an agent that supports remotely launching a local program, then the UFA broker can format multiple volumes by remotely running the utility on each volume.

The ConfigureDiskSet command completes when the volume and file system operations specified by the new configuration have all completed. The UFA broker may aggregate the statuses of the individual operations into a list of results, and pass the list back as an output parameter.

A cleanup phase is needed when a UFA slave is used to perform the disk set reconfiguration. After completing the ConfigureDiskSet command, the UFA broker deconstructs the storage stacks and optionally disconnects the data path between the snapshot and the slave, as described in Response to UnexportVolume. If a temporary snapshot was used, it may be deleted at as part of the cleanup process.

UFA Slave Agent

In one embodiment, a slave computer's purpose is to decode the volumes and file systems of a disk set specified by the UFA broker, and to carry out UFA data access commands forwarded by the broker. The set of volume formats and file systems formats that a slave is capable of processing is defined by the set of LVMs and FSDs present in the slave's software stack. The UFA broker communicates with a slave computer through the slave agent program. The broker and slave agent interact using a proprietary or public remote communication protocol, the design and embodiment of which is well known to anybody skilled in the art. In general, a slave agent responds to three types of commands from the UFA broker.

The UFA sends one more mount commands to a slave agent during the data path and storage stack construction phase. This phase usually starts with a disk mount command, wherein the slave agent is instructed to notify the operating system of the presence of one or more source disks belonging to the disk set to be processed, which causes a disk driver to create the first layer of the storage stack. This is usually followed by volume, then file system mount commands, which construct the remainder of the storage stack, thereby exposing the disk set's file system(s).

Some operating systems automatically detect new disk devices added to one of the computer's host bus adapters. Such operating systems can orchestrate a process wherein logical volume managers and drivers automatically detect available volumes and file systems on the disks, thereby creating storage stacks automatically. On such operating systems, explicit mount commands may be unnecessary, and the UFA slave agent may simply need to wait for the storage stacks to become complete. When a particular data path and storage stack is no longer needed, the UFA broker sends one or more unmount commands to tear down the storage stacks in the reverse order they were constructed.

Once the necessary storage stack(s) are established on the slave, the UFA broker sends a data access or manipulation command to the slave on behalf of the requester. The command can specify network file system creation (ExportVolumes), individual file/record processing (ProcessFiles), FPA download and execution (ExecuteProgramOnVolume), file system analysis (AnalyzeDiskSet) or disk set reconfiguration (ConfigureDiskSet).

The specific UFA commands that a slave agent accepts may be simpler versions of the ones that the UFA broker exposes to requesters. For instance, the ExportVolumes command that a requester sends to the UFA broker may contain user account credentials that the broker checks to authorize the command. Once the command is authorized, the UFA broker can send a similar, but simpler version of ExportVolumes to the slave agent. The simpler version can, for example, omit the user account credentials, since the command was already authorized by the broker, and therefore the slave agent does not need to duplicate that task.

The way in which a slave carries out ExportVolumes and ExecuteProgramOnVolume command has been described in detail earlier. A slave-side processing of the three remaining commands is presented in more detail. A slave agent carries out the ProcessFiles command as follows. If the command contains a file operation, the agent accesses the file directly using the locally constructed storage stack, and then returns the operation's status code, and any file data if appropriate (e.g. in the case of a file read operation). The access is performed using the file system API exposed by the local FSD or network file system client. If the command contains a file record operation, the slave agent locates the file, and then forwards the requested record-level operation to a program capable of decoding the file's data format. For example, if the file is a Windows registry hive, and the record a registry entry, the agent may request the local Windows OS to access the record, using an API of the OS; if the file is a database and the record a particular database item, the agent may forward the request to the appropriate database management program. It is appreciated that the agent does not require the program if it natively has knowledge of the file format because, in this case, the agent may perform the operation directly.

AnalyzeDiskSet and ConfigureDiskSet involve disk and file system operations, therefore the slave agent carries out those commands by sending requests to either the FSD or local operating system, or both.

A UFA broker may periodically probe its slaves to determine their health. A slave agent replies to a probe command with a set of health and performance statistics, such as the current CPU load, memory usage, free local disk space, and number of data storage stacks currently being used to handle previously issued UFA commands. When servicing a particular UFA command, a UFA broker may find that more than one slave is eligible to serve as the storage stack provider for the selected disk set. Knowing each eligible slave's current health allows the broker to select the most lightly loaded slave, thereby balancing the workload and improving the overall performance of the UFA service in the presence of large numbers of requesters.

Client Agents

When the disk set identifier passed to a UFA command refers to the disk set of an active client and the synchronize flag is set, the UFA broker selects the client itself for providing the storage stack and carrying out the UFA command, as explained in Storage Stack Provided By Client Computer. The broker communicates with the client through one or more agents running on the client. The communication can be implemented using a number of well known network protocols and software techniques.

If a UFA client agent is installed on the client computer, the UFA broker forwards the UFA command to the client agent for execution. Unlike a UFA slave agent, a UFA active agent does not need to execute mount/unmount commands, since the data path and storage stacks are already set up in the client at the time of the UFA request. The disk set's volumes and file systems are accessible to programs running on the client, including the client agent. A client agent thus only needs to carry out UFA commands forwarded by the UFA broker.

It is possible for a client computer not to have a UFA-aware agent. The UFA architecture does not require UFA client agents, and therefore a particular UFA solution may not supply client agents, possibly to reduce costs or complexity. As described earlier, the UFA broker can work around this by identifying other agents available on each client computer, and determining their capabilities.

When a client is selected for carrying out a UFA command, the broker can decompose the command into simpler and smaller commands that UFA-unaware agents can execute. For example, the ExecuteProgramOnVolume command can be decomposed into the sequence: copy program file; execute locally copied program; delete copied program; report execution status back to server.

Automatic Selection of Optimal Storage Stack Provider

Under the UFA model, a file processing application or a requester acting on behalf of it is not directly tied to specific clients or storage infrastructure elements. The requester instead communicates to a UFA broker the disk set that it wishes to access, along with a set of requirements, and a set of preferences about the access method to be used. Based on those specifications, the UFA broker analyzes the infrastructure and sets up an optimal data path and storage stack provider that meets the application's needs.

Figure 9:
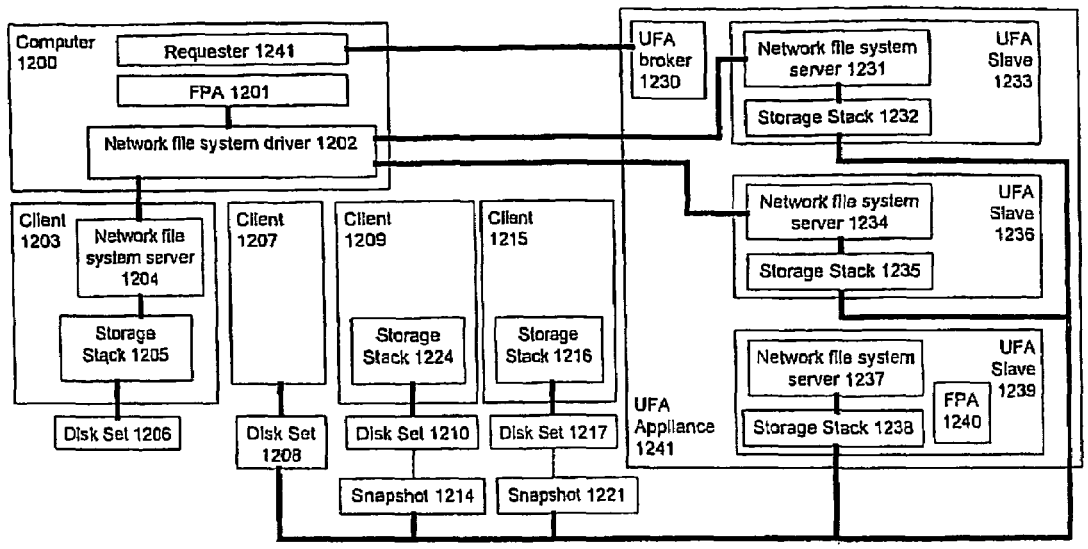
FIG. 9 illustrates a mechanism of handling disk set accesses under the UFA model in accordance with an embodiment of the present invention.

FIG. 9 illustrates how exemplary disk set access scenarios are handled under the UFA model in accordance with an embodiment of the present invention. Assume that FPA 1201 wishes to access the most current version of a file system residing on disk set 1206, which belongs to client 1203, with a network file system as the preferred access method. A requester 1241 acting on behalf of the FPA (or the FPA itself) sends a ExportVolumes command to UFA broker 1230 with the synchronize flag set. The broker discovers that client 1203 is currently active, and elects it as the storage stack provider. The broker then replies to the requester, instructing it to access the file system through network file system server 1204. The requester mounts the network file system onto a local directory of computer 1200, then instructs the FPA to process the mounted files. When the FPA completes, the requester unmounts the network file system and sends UnexportVolume to the UFA broker to indicate that it is finished with the file system.

It is assumed further that the same FPA 1201 wishes to access the most current version of a file system residing on disk set 1208, which belongs to client 1203, with a network file system as the preferred access method. This time, the UFA broker discovers that client 1203 is powered off, causing it to set up a compatible proxy computer (UFA slave 1239) for providing the storage stack and network file system server. It then replies to the requester, instructing it to access the file system through network file system server 1237.

If, on the other hand, an FPA does not need to process the most current version of a client's file system (e.g., the access is unsynchronized), the UFA broker automatically creates a snapshot of the client's disk set if necessary, and then sets up a UFA slave as a proxy for exposing the snapshot's file systems. A snapshot is not needed if the client is powered off, in which case the selected proxy exposes the client's disk set directly.

The previous examples show that the UFA broker hides the details of the client's power state and the set up of a proxy computer, if needed. When a requester requests network file system access to a specified file system, the UFA broker returns an identifier for a network file system server which is guaranteed to expose the specified file system. The requester and FPA are not concerned with what computer the network file system runs on, as long as it exports the desired file system.

In addition to network file system access through ExportVolumes, the UFA service offers alternative access methods that can simplify the FPA's set up or improve its performance. Suppose, for example, that FPA 1201 requests unsynchronized access to the disk set 1210 of active client 1209. Furthermore, assume that the network file system access method is undesirable either because computer 1200 lacks a network file system driver, or because the general purpose network is slow.

The requester 1241 can also use the ExecuteProgramOnVolume command to give the FPA performance-optimal access to the file system in a way that bypasses the network. Since the client is active and synchronization is not required, the UFA broker creates snapshot 1214 from disk set 1210, then configures a compatible UFA slave computer 1239 as a proxy to serve the snapshot. The broker then makes a copy 1240 of FPA 1201 on the slave, and then executes the copy, allowing it to access the snapshot through a local data path. When the program completes, it is deleted from the proxy, and its results sent back to the requester.

Embodiments of the present invention support virtual machines as well as physical computers. When an FPA or requester requests file system access to a disk set composed of file-mapped virtual disks, and a proxy computer is needed (e.g. the virtual machine is powered off or the disk set is a snapshot), the UFA broker automatically selects a slave computer capable of decoding the two storage stacks leading to the file systems residing on the virtual disks. The first storage stack exposes the volumes and file systems that contain the virtual disk files. The second stack exposes the volumes and file systems of the virtual disks themselves. A virtual disk driver joins the two stacks.

Combined with the client state independence property, the present invention provides a uniform way for FPAs to access the file systems of a large number of client computers, physical or virtual, including powered-off or suspended virtual machines, and independent of the volume or file system formats used by the clients.

When a UFA system is configured with multiple slave computers with similar capabilities, the UFA broker can select a slave in a load-balanced manner, e.g. the broker selects the least busy slave. The scalability of a UFA system can thus grow by adding more slaves, thereby improving its ability to handle a growing number of concurrent requesters and FPAs.

The set of volume and file system formats supported by a UFA system is determined by the LVMs and file system drivers contained within slave computers. In order to add support for a new format, a UFA administrator can either add new LVMs and FSDs to existing slaves, or add a slave running an operating system that includes the necessary drivers.

Exemplary Implementations

The flexible and extensible nature of the UFA architecture makes it attractive for a vendor to customize a particular UFA implementation to optimize cost, completeness, ease of use, or performance.

A UFA system may be configured as a hardware appliance and this implementation is an attractive way to add UFA capabilities to an existing computing environment. One possible implementation is a rack of small-footprint and tightly integrated blade computers. One of the blades serves as the master computer, e.g., its software contains the UFA broker program. In this implementation, the other blades act as slaves, and each comes equipped with its own software stack, composed of an OS, a UFA slave agent, one or more LVMs and one or more file system drivers. Different slaves can be configured with different software stacks, thus expanding the set of volume and file system formats that the UFA appliance can support. For future growth and expandability, some blade slots can be left empty, allowing a customer to add slaves later to increase load-balancing capacity or expand volume and file system format support.

In this implementation, the appliance contains at least one internal IP network connecting the blades together, and at least one external NIC, allowing the internal network to connect to the external network of the managed computing environment. The appliance optionally includes one or more HBAs connecting the blades to an external SAN. The UFA broker optionally provides a remotely invocable administration interface allowing an administrator to configure and tune the appliance, including adding/removing blades, and setting UFA policies. The interface can be a text based command-line interface, or a graphical interface (such as a Web configuration page).

Implementations may also include a virtual machine-based UFA appliance. Not only does the UFA architecture support virtual machine clients, the UFA master and UFA slave computers themselves can be virtual machines in this implementation. To minimize hardware costs, a vendor can develop a UFA appliance based on a single computer hosting multiple virtual machines. One of the VMs acts as a master and hosts the UFA broker, while others are used as slaves. Expanding the set of supported volume and file system formats can be done by adding virtual machines with new operating systems, LVMs, and drivers using the appliance's administration interface. Performance and capacity can be improved by adding more CPUs and memory to the physical computer.

Implementations may also include a single-computer UFA appliance. In this implementation, an appliance can also be constructed from a single physical computer with no virtual machine software. By installing a UFA broker and a UFA slave agent in the software stack, the computer can act both as a master and a slave, thereby forming a functional UFA system. Since a single computer can generally run only one operating system at a time, the only way to expand volume and file system format is to add additional LVMs and file system drivers to the existing software stack. Scalability and performance can be improved by adding more CPUs and memory to the computer.

In another implementation, a vendor can provide UFA functionality as a kit of pure software components. In this case, the UFA user or administrator provides the hardware, and constructs a UFA system by installing the software on designated computers of an existing managed computing environment. In addition to UFA broker, UFA slave agent, and optional UFA client agent software, the kit may include a configuration program allowing the administrator to configure the UFA broker and register UFA slave computers.

As explained above, a UFA broker can leverage a systems/storage management application already present in the computing environment to query and manage client computers, storage devices, and the network infrastructure. It can also use those applications to control devices, such as programming SAN switches to enable a particular data path. Finally, it can communicate with systems/storage management client agents to carry out UFA commands.

If a UFA software vendor is also a systems/storage management software vendor, UFA functionality can be merged into an existing SM product. This reduces the number of software components, thus reducing management complexity. For example, if UFA functionality is integrated into SM client agents, there would not be a need for a separate UFA client agent in case the standard SM agent is incapable of servicing certain UFA commands. Similarly, the UFA database can be integrated into the SM database.

It is appreciated that a UFA system vendor could build special-purpose embodiments that have a subset of the general capabilities described above. For instance, the general UFA interface specification includes three different file system access methods, which herein is described as the ExportVolumes, ProcessFiles, and ExecuteProgramOnVolume commands. A smaller-scale embodiment of UFA can omit support for some of those methods. An implementation may optionally omit support for the synchronize flag, and always assume that it is unset. This would cause the UFA system to always take a snapshot of a selected disk set, if the disk set is active at the time the UFA request is received.

Virtual Machine Scanner

As explained earlier, one complication that virtual machines introduce to a managed computing environment is a potentially large number of inactive (powered-off and suspended) VMs. A running a VM consumes a host's memory and CPU cycles, potentially degrading the performance of other VMs running the host. It is thus advantageous to leave VMs that are not immediately needed powered off. Inactive VMs can, however, can become a hazard to the environment if their file systems are not regularly checked for viruses or software vulnerabilities. For instance, an inactive VM whose software vulnerabilities are not patched can become infected with a virus the next time it powers on and connects to the network, thereby putting other computers at risk. Unfortunately, the prior art provides no simple framework for accessing the files of a large number of inactive VMs.

A UFA system can be constructed, in one embodiment, for VMs using the methods described herein. Such a system could be the foundation for a VM scanning framework that allows a set of off-the-shelf FPAs to analyze and process the file systems of a large number of managed VMs in an around-the-clock manner. The framework can scan both active and inactive VMs in a way that is non-intrusive the VMs. The FPAs do not need to be aware of the UFA system, and can include applications such as vulnerability detectors, virus scanners, and backup applications.

Figure 10:
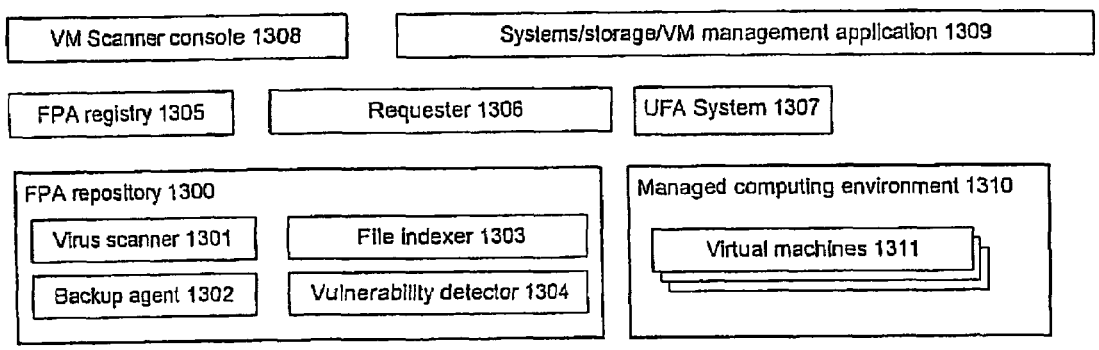
FIG. 10 illustrates exemplary components of a scanning application in accordance with an embodiment of the present invention.

FIG. 10 illustrates the components of the scanning application in accordance with one embodiment of the present invention. The application extends an existing computing environment 1310 containing virtual machines 1311 and managed by a systems/storage/virtual machine management application 1309.

The scanner application is composed of a UFA system 1307, a management console 1308, a requester 1306, a file processing application repository 1300 containing one or more FPAs, and a registry 1305 listing the FPAs present in the repository. The console provides to the administrator an interface for scheduling, controlling, and obtaining results from VM scanning jobs.

At scheduled times, the console requests from the systems/storage/VM management application a list of the virtual machines present in the managed environment. The console also obtains a list of available FPAs from the registry. It then passes the two lists to the requester. For each virtual machine, the requester sends an ExportVolumes command to the UFA system to export the file systems of the virtual machine. The disk set identifier it passes is an identifier for the virtual machine itself. The synchronize flag is unset, hence granting the UFA system the freedom to create and export a temporary snapshot of the virtual machine's disk set in case the VM is actively running.

The requester mounts the virtual machine's network file systems to local directories on a selected computer, and then launches each of the registered FPAs in succession on the computer, allowing them to analyze the VM's file systems through the mounted directories. The requester aggregates the results output by the FPAs and forwards them to the VM scanner console. When the last FPA finishes executing, the requester unmounts the network file systems, and then sends an UnexportVolume command for each of the network file systems. It then repeats the process for the next virtual machine.

An administrator can view the aggregated FPA results in the console application. This allows the administrator to quickly identify which VMs contain viruses or vulnerabilities, and thus need to be updated.

SECTION III

Virtualization

Embodiments of the present invention may be implanted using virtual machine technology. The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization also provides greater security, since the virtualization can isolate potentially unstable or unsafe software so that it cannot adversely affect the hardware state or system files required for running the physical (as opposed to virtual) hardware.

Figure 11A:
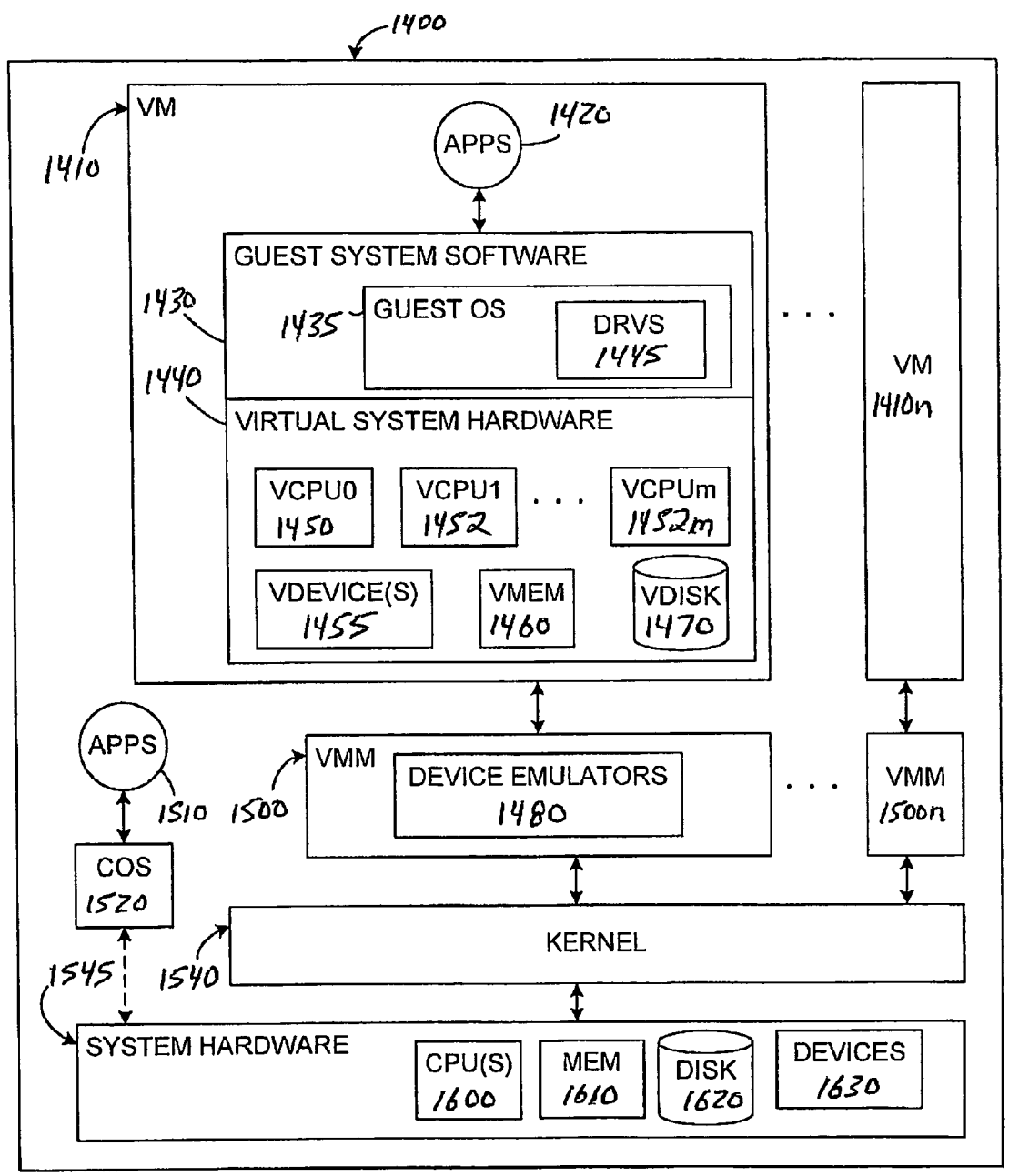
FIG. 11A illustrates a non-hosted computer configuration that implements virtualization.

As is well known in the field of computer science, a virtual machine (VM) may be described as a software abstraction—a "virtualization"—of an actual physical computer system. FIG. 11A shows one possible arrangement of a computer system 1400 that implements virtualization. Any of the above described computer systems can be implemented in accordance with the below descriptions. A VM 1410, which in this system is a "guest," is installed on a "host platform," or simply "host," which will include system hardware 1545, that is, a hardware platform, and one or more layers or co-resident components comprising system-level software, such as an operating system (OS) or similar software layer responsible for coordinating and mediating access to hardware resources.

As software, the code defining the VM will ultimately execute on the actual system hardware 1545. As in almost all computers, this hardware will include one or more CPUs 1600, some form of memory 1610 (volatile or non-volatile), one or more storage devices such as one or more disks 1620, and one or more devices 1630, which may be integral or separate and removable.

In many existing virtualized systems, the hardware processor(s) 1600 are the same as in a non-virtualized computer with the same platform, for example, the Intel x-86 platform. Because of the advantages of virtualization, however, some hardware processors have also been developed to include specific hardware support for virtualization.

Each VM 1410 will typically mimic the general structure of a physical computer and as such will usually have both virtual system hardware 1440 and guest system software 1430. The virtual system hardware typically includes at least one virtual CPU 1450, virtual memory 1460, at least one virtual disk 1470 or similar virtualized mass storage device, and one or more virtual devices 1455. Note that a disk—virtual 1470 or physical 1620—is also a "device," but is usually considered separately because of the important role it plays. All of the virtual hardware components of the VM may be implemented in software to emulate corresponding physical components. The guest system software includes a guest operating system (OS) 1435 and drivers 1445 as needed, for example, for the various virtual devices 1455.

To permit computer systems to scale to larger numbers of concurrent threads, systems with multiple CPUs—physical or logical, or a combination—have been developed. One example is a symmetric multi-processor (SMP) system, which is available as an extension of the PC platform and from other vendors. Essentially, an SMP system is a hardware platform that connects multiple processors to a shared main memory and shared I/O devices. Yet another configuration is found in a so-called "multi-cored" architecture, in which more than one physical CPU is fabricated on a single chip, with its own set of functional units (such as a floating-point unit and an arithmetic/logic unit ALU), and can execute threads independently; multi-cored processors typically share only very limited resources, such as at least some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB).

Similarly, a single VM may (but need not) be configured with more than one virtualized physical and/or logical processor. By way of example, FIG. 11A illustrates multiple virtual processors 1450, 1452, . . . , 1452m (VCPU0, VCPU1, . . . , VCPUm) within the VM 1410. Each virtualized processor in a VM may also be multi-cored, or multi-threaded, or both, depending on the virtualization. Embodiments of the present invention may be used to advantage regardless of the number of processors the VMs are configured to have.

If the VM 1410 is properly designed, applications 1420 running on the VM will function as they would if run on a "real" computer, even though the applications are running at least partially indirectly, that is via the guest OS 1435 and virtual processor(s). Executable files will be accessed by the guest OS from the virtual disk 1470 or virtual memory 1460, which will be portions of the actual physical disk 1620 or memory 1610 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is generally required between the guest software within a VM and the various hardware components and devices in the underlying hardware platform. This interface—referred to in this text as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the embodiments of the present invention described herein may be used in virtualized computer systems having any type or configuration of virtualization software. Moreover, some embodiments of the present invention are described and illustrated herein as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software.

By way of illustration and example only, each VM may be shown or described as running on a corresponding virtual machine monitor. Any reference to VMMs is also merely by way of common example. A VMM is usually a software component that virtualizes at least one hardware resource of some physical platform, so as to export a hardware interface to the VM corresponding to the hardware the VM "thinks" it is running on. As FIG. 11A illustrates, a virtualized computer system may (and usually will) have more than one VM, each of which may be running on its own VMM.

The various virtualized hardware components in the VM, such as the virtual CPU(S) 1450, etc., the virtual memory 1460, the virtual disk 1470, and the virtual device(s) 1455, are shown as being part of the VM 1410 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, which facilitate, for example, migration of VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, embodiments of the present invention are not restricted to use in systems with any particular "degree" of virtualization and are not to be limited to any particular notion of full or partial ("para-") virtualization.

In addition to the distinction between full and partial (para-) virtualization, two arrangements of intermediate system-level software layer(s) are in general use as, or as part of, the virtualization software—a "hosted" configuration (illustrated in FIG. 11B) and a non-hosted configuration (illustrated in FIG. 11A). In a hosted virtualized computer system, an existing, general-purpose operating system forms a "host" OS that is used to perform certain input/output (I/O) operations, alongside and sometimes at the request and direction of a virtualization software component such as the VMM 1500n. The host OS 1520, which usually includes drivers 1660 and supports applications 1510 of its own, and the VMM (or similar component) are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

Figure 11B:
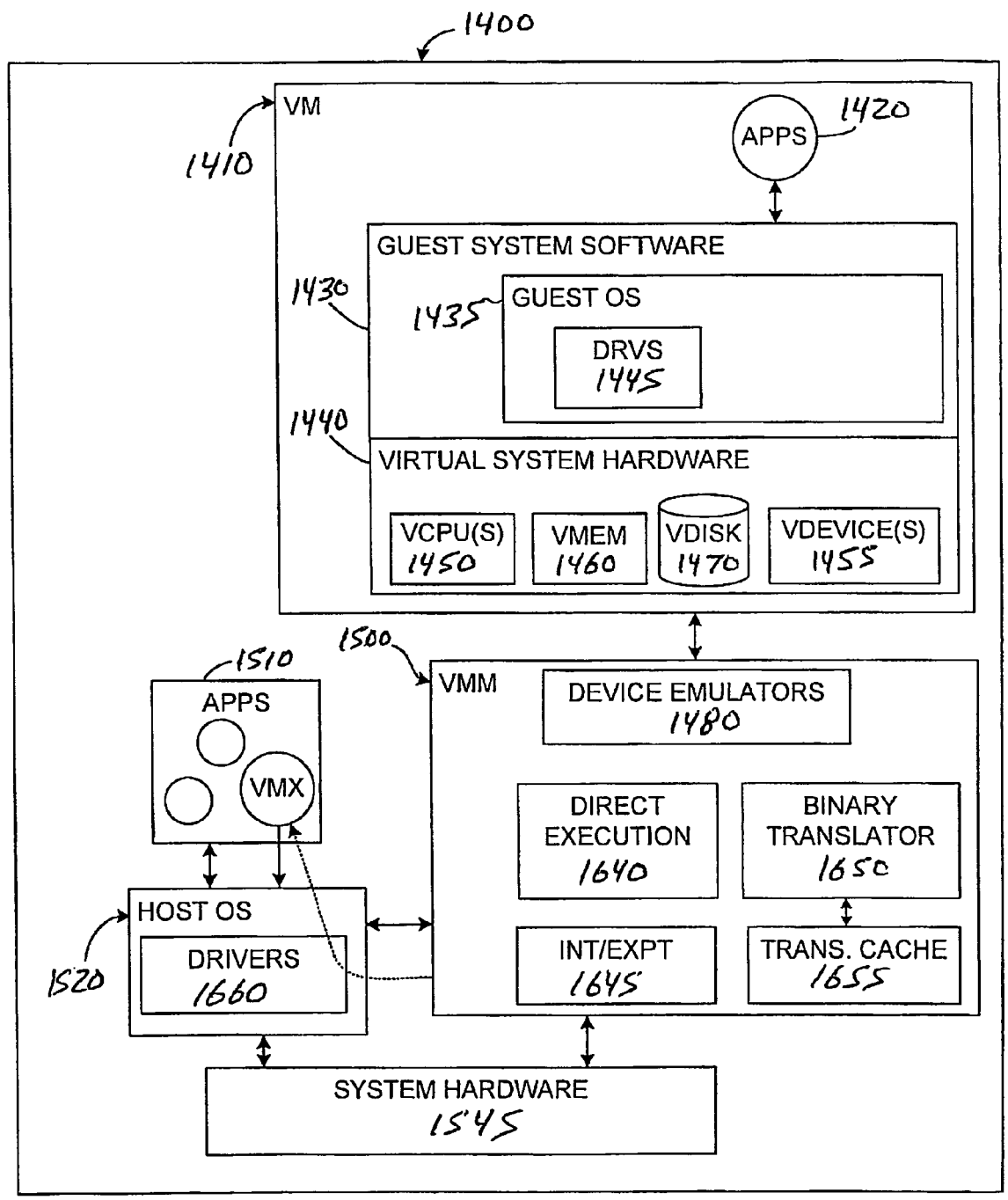
FIG. 11B illustrates a hosted computer configuration that implements virtualization.

In addition to device emulators 1480, FIG. 11B also illustrates some of the other components that are also often included in the VMM of a hosted virtualization system; many of these components are found in the VMM of a non-hosted system as well. For example, exception handlers 1645 may be included to help context-switching (see again U.S. Pat. No. 6,496,847), and a direct execution engine 1640 and a binary translator 1650, often with an associated translation cache 1655, may be included to provide execution speed while still preventing the VM from directly executing certain privileged instructions in systems that do not otherwise provide such protection (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel 1540—constructed specifically to provide efficient support for the VMs. This configuration is frequently referred to as being "non-hosted." Compared with a system in which VMMs (or other software components or layers with similar functionality) run directly on the hardware platform (such as shown in FIG. 11B), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 1540 also handles any other applications running on it that can be separately scheduled, as well as any temporary "console" operating system 1520 that, in some systems, is included for such operations as boot the system as a whole or enabling certain user interactions with the kernel. The console OS in FIG. 11A may be of the same type as the host OS in FIG. 11B, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005).

Embodiments of the present invention may be used to advantage in both a hosted a non-hosted virtualized computer system, regardless of the degree of virtualization in which the virtual machine(s) have any number of physical and/or logical virtualized processors. Embodiments of the present invention may also be implemented directly in a computer's primary OS, both where the OS is designed to support virtual machines and where it is not. Moreover, embodiments of the present invention may even be implemented wholly or partially in hardware, for example in processor architectures intended to provide hardware support for virtual machines.

The foregoing descriptions of specific embodiments of the present invention, a system or appliance providing universal file access for a heterogeneous computing environment, have been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An offloaded file processing software architecture comprising:
   a master system, the master system in communication with a plurality of client computers, the plurality of client computers include a virtual machine having a virtual disk, the virtual disk configured to store a file system of the virtual machine;
   a plurality of physical slave systems, each comprising different configurations and each are in communication with the master system; and
   a plurality of virtual slave systems, each comprising different configurations, each are in communication with the master system, and each includes a file driver to connect to the file system of the virtual machine,
      wherein said master system, in response to receiving a service request from a requester, is operable to execute a command issued by said service request, wherein said command involves operations performed by at least one of said plurality of slave systems and an offloaded file processing activity performed with respect to a disk set derived from said service request,
      wherein if the service request from the requester includes a request to access the file system of the virtual machine when the virtual machine is off, the master system uses one of the plurality of virtual slave systems to connect to the file system of the virtual machine through the file driver loaded in the one of the plurality of virtual slave systems to access the file system of the virtual machine.

2. The software architecture as described in claim 1 wherein said requester is a file processing application (FPA).

3. The software architecture described in claim 1 wherein said service request identifies a client computer associated with said disk set and wherein further said master system, transparent to said requester, is operable to automatically determine volumes and file systems residing on said disk set, is further operable to automatically determine volume formats and file system formats used by said disk set and automatically determine existence and a state of said client computer.

4. The software architecture as described in claim 3 wherein said state of said client computer is selected between powered-on and powered-off.

5. The software architecture as described in claim 4 wherein said master system is further operable to perform the following operations transparent to said requester:
   if said client computer is determined to be existent and powered-on, then:
      determining a mechanism for generating a snapshot of said disk set; taking a snapshot of said disk set using said mechanism; and determining a network address of said snapshot; and
   if said client computer is determined to be non-existent or powered-off, then determining a network address of said disk set for accessing thereof.

6. The software architecture as described in claim 3 wherein said master system is further operable to perform the following operations transparent to said requester:
   automatically determining a hardware type of said client computer; and
   automatically determining a hardware type of said disk set, wherein said hardware type is selected between physical and virtual.

7. The software architecture as described in claim 3 wherein said master system in executing said command performs the following:
   transparent to said requester, selecting a slave system of said plurality of slave systems that is compatible with a file system of said disk set;
   transparent to said requester, establishing on said slave system a network file system mapped to a file system of said disk set;
   communicating a network address of said network file system to said requester; and
   allowing said requester to manipulate said network file system using a file sharing protocol that is independent of said file system of said disk set and is independent of a protocol of a computer system of said requester.

8. The software architecture as described in claim 3 wherein said service request further comprises an operation to be performed on said disk set and wherein further said master system in executing said command performs the following:
   selecting a slave system of said plurality of slave systems that is compatible with a file system of said disk set;
   causing said slave system to execute said operation on said disk set; and
   returning a message to said requester indicating a result of said operation.

9. The software architecture as described in claim 3 wherein said service request further comprises a location of a file processing application (FPA) and wherein further said master system in executing said command performs the following:
   transparent to said requester, selecting a slave system of said plurality of slave systems that is both compatible with a file system of said disk set and also compatible with a required environment for said FPA;
   establishing said FPA on said slave system;
   executing said FPA on said slave system which operates on said disk set; and
   returning a message to said requester indicating a result of said executing said FPA.

10. The software architecture described in claim 1 wherein said service request specifically identifies said disk set wherein further said master system, transparent to said requester, is operable to automatically determine a client computer associated with said disk set, is operable to automatically determine volumes and file systems residing on said disk set, is further operable to automatically determine volume formats and file system formats used by said disk set and automatically determine existence and a state of said client computer.

11. The software architecture as described in claim 1 wherein said master system and at least one of said slave systems are integrated into a same system.

12. An offloaded file processing software architecture comprising:
a master system, the master system in communication with a plurality of client computers, the plurality of client computers include a virtual machine having a virtual disk, the virtual disk configured to store a file system of the virtual machine;
a plurality of physical slave systems coupled to said master system; and
a plurality of virtual slave systems coupled to said master system, each of the plurality of virtual slave systems includes a file driver to connect to the file system of the virtual machine, wherein said master system is operable to receive a service request from a requester, said service request identifying a command and information from which a disk set is derived, said master system, in response to receiving said service request, operable to perform the following operations transparent to said requester:
determining requirements for accessing said disk set;
selecting a selected slave system of said plurality of slave systems based on said requirements; and
executing said command using said selected slave system wherein said executing causes said disk set, or a snapshot thereof, to be accessed based on said requirements,
wherein if the service request from the requester includes a request to access the file system of the virtual machine when the virtual machine is off, the master system uses the selected virtual slave system to connect to the file system of the virtual machine through the file driver loaded in the selected virtual slave system to access the file system of the virtual machine.

13. The software architecture of claim 12 wherein said requester is a file processing application (FPA).

14. The software architecture of claim 12 wherein said determining requirements for accessing said disk set comprises:
automatically determining volumes and file systems residing on said disk set;
automatically determining volume and file system formats used on said disk set; and
automatically determining existence and a state of a client computer associated with said disk set, wherein said state is selected between powered-on and powered-off.

15. The software architecture of claim 14 wherein said determining requirements for accessing said disk set further comprises:
if said client computer is determined to be existent and powered-on, then:
determining a mechanism for generating a snapshot of said disk set; taking said snapshot of said disk set using said mechanism; and determining a network address of said snapshot; and
if said client computer is determined to be non-existent or powered-off, then determining a network address of said disk set for access thereof.

16. The software architecture of claim 15 wherein said determining requirements for accessing said disk set further comprises:
automatically determining a hardware type of said client computer and automatically determining a hardware type of said disk set wherein said hardware type is selected between physical and virtual.

17. The software architecture of claim 12 wherein said service request further comprises an identification of said client computer that is common to said requester and wherein further said determining requirements for accessing said disk set further comprises translating said identification of said client computer that is common to said requester to a network address of said client computer.

18. The software architecture of claim 12 wherein said master system in executing said command performs the following:
establishing, on said selected slave system, a network file system mapped to a file system of said disk set;
communicating a network address of said network file system to said requester; and
allowing said requester to manipulate said network file system using a file sharing protocol that is independent of said file system of said disk set.

19. The software architecture of claim 12 wherein said service request further comprises an operation to be performed on said disk set and wherein further master system in executing said command performs the following:
causing said selected slave system to perform said operation on said disk set; and
returning a message to said requester indicating a result of said operation.

20. The software architecture of claim 12 wherein said service request further comprises a location of a file processing application (FPA), wherein said selected slave system is also compatible with a required environment for said FPA and wherein further said master system in executing said command performs the following:
establishing said FPA on said selected slave system;
executing said FPA on said selected slave system which operates on said disk set; and
returning a message to said requester indicating a result of said executing said FPA.

21. The software architecture as described in claim 12 wherein said master system and at least one of said slave systems are integrated into a same system.

22. An offloaded file processing software system for a heterogeneous computer network, said architecture comprising:
a primary system, the primary system in communication with a plurality of client computers, the plurality of client computers include a virtual machine having a virtual disk, the virtual disk configured to store a file system of the virtual machine;
a plurality of secondary systems coupled to said primary system; and wherein said primary system is operable to receive a service request from a requester, said service request identifying a command and information from which a disk set is derived, said primary system, in response to receiving said service request, operable to perform the following operations:
transparently to said requester, determining requirements for accessing said disk set;
selecting a selected secondary system of said plurality of slave systems based on said requirements; and
using said selected secondary system and said command to facilitate an offloaded file processing activity wherein said requirements are transparent to said requester,
wherein if the service request from the requester includes a request to access the file system of the virtual machine when the virtual machine is off, the primary system uses the selected secondary system that includes a file driver to connect to the file system of the virtual machine, to connect to the file system of the virtual machine through the file driver to access the file system of the virtual machine.

23. The system of claim 22 wherein said using said selected secondary system and said command to facilitate an offloaded file processing activity comprises:
   establishing, on said selected secondary system, a network file system mapped to a file system of said disk set;
   communicating a network address of said network file system to said requester; and
   allowing said requester to manipulate said network file system using a file sharing protocol that is independent of said file system of said disk set.

24. The system of claim 22 wherein said service request further comprises an operation to be performed on said disk set and wherein further said using said selected secondary system and said command to facilitate an offloaded file processing activity comprises:
   causing said selected secondary system to perform said operation on said disk set; and
   returning a message to said requester indicating a result of said operation.

25. The system of claim 22 wherein said service request further comprises a location of a file processing application (FPA), wherein said selected secondary system is compatible with a required environment for said FPA and wherein further said using said selected secondary system and said command to facilitate an offloaded file processing activity comprises:
   establishing said FPA on said selected secondary system;
   executing said FPA on said selected secondary system which operates on said disk set; and
   returning a message to said requester indicating a result of said executing said FPA.

26. The system of claim 22 wherein said determining requirements for accessing said disk set comprises:
   automatically determining volumes and file systems residing on said disk set;
   automatically determining volume formats and file system formats used on said disk set; and
   automatically determining existence and a state of said client computer, wherein said state is selected between powered-on and powered-off.

27. An offloaded file processing software system for a heterogeneous computer network, said architecture comprising:
   a primary system, the primary system in communication with a plurality of client computers, the plurality of client computers include a virtual machine having a virtual disk, the virtual disk configured to store a file system of the virtual machine;
   a plurality of secondary systems coupled to said primary system; and wherein said primary system is operable to receive a service request from a requester, said service request identifying a command and information from which a disk set is derived, said primary system, in response to receiving said service request, operable to perform the following operations:
   transparently to said requester, determining requirements for accessing said disk set, wherein said determining requirements for accessing said disk set comprises:
   automatically determining volumes and file systems residing on said disk set;
   automatically determining volume formats and file system formats used on said disk set; and
   automatically determining existence and a state of a client computer associated with said disk set, wherein said state is selected between powered-on and powered-off;
   selecting a selected secondary system of said plurality of secondary systems based on said requirements; and
   using said selected secondary system and said command to facilitate an offloaded file processing activity wherein said requirements are transparent to said requester,
   wherein if the service request from the requester includes a request to access the file system of the virtual machine when the virtual machine is off, the primary system uses the selected secondary system that includes a file driver to connect to the file system of the virtual machine, to connect to the file system of the virtual machine through the file driver to access the file system of the virtual machine.

28. The system of claim 27 wherein said using said selected secondary system and said command to facilitate an offloaded file processing activity comprises:
   establishing, on said selected secondary system, a network file system mapped to a file system of said disk set;
   communicating a network address of said network file system to said requester; and
   allowing said requester to manipulate said network file system using a file sharing protocol that is independent of said file system of said disk set.

29. The system of claim 27 wherein said service request further comprises an operation to be performed on said disk set and wherein further said using said selected secondary system and said command to facilitate an offloaded file processing activity comprises:
   causing said selected secondary system to perform said operation on said disk set; and
   returning a message to said requester indicating a result of said operation.

30. The system of claim 27 wherein said service request further comprises a location of a file processing application (FPA), wherein said selected secondary system is compatible with a required environment for said FPA and wherein further said using said selected secondary system and said command to facilitate an offloaded file processing activity comprises:
   establishing said FPA on said selected secondary system;
   executing said FPA on said selected secondary system which operates on said disk set; and
   returning a message to said requester indicating a result of said executing said FPA.

31. The system of claim 27 wherein said requester is a file processing application (FPA).

32. The system of claim 27 wherein said primary system and at least one of said secondary systems are integrated into a same system.

* * * * *

UNITED STATES PATENT AND TRADEMARK OFFICE
CERTIFICATE OF CORRECTION

PATENT NO. : 7,606,868 B1  Page 1 of 1
APPLICATION NO. : 11/395082
DATED : October 20, 2009
INVENTOR(S) : Bich Cau Le et al.

It is certified that error appears in the above-identified patent and that said Letters Patent is hereby corrected as shown below:

Title Page, Item (73) Assignee

"WMware, Inc., Palo Alto, CA (US)"

should read

--VMware, Inc., Palo Alto, CA (US)--

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,606,868 B1 |
| APPLICATION NO. | : 11/395082 |
| DATED | : October 20, 2009 |
| INVENTOR(S) | : Le et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 874 days.

Signed and Sealed this

Twelfth Day of October, 2010

David J. Kappos
*Director of the United States Patent and Trademark Office*